(12) United States Patent  
Aoki

(10) Patent No.: US 8,854,528 B2  
(45) Date of Patent: Oct. 7, 2014

(54) IMAGING APPARATUS

(75) Inventor: Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 862 days.

(21) Appl. No.: 13/039,815

(22) Filed: Mar. 3, 2011

(65) Prior Publication Data

US 2011/0228053 A1 Sep. 22, 2011

(30) Foreign Application Priority Data

Mar. 18, 2010 (JP) .................................. 2010-062871

(51) Int. Cl.
*G03B 13/00* (2006.01)
*H04N 13/02* (2006.01)
*H04N 5/232* (2006.01)

(52) U.S. Cl.
CPC ....... *H04N 13/0217* (2013.01); *H04N 13/0239* (2013.01); *H04N 5/23212* (2013.01); *H04N 13/021* (2013.01)
USPC ............................................ 348/345; 348/49

(58) Field of Classification Search
CPC ............ G02B 7/30; G02B 7/34; G02B 7/343; G02B 7/346; G02B 7/36; G02B 7/38; H04N 5/23212
See application file for complete search history.

(56) References Cited

U.S. PATENT DOCUMENTS

| 6,882,369 B1 * | 4/2005 | Ito .................................. 348/345 |
| 8,018,524 B2 * | 9/2011 | Kawarada ...................... 348/350 |
| 2004/0202461 A1 * | 10/2004 | Nakahara ...................... 396/104 |
| 2005/0168621 A1 * | 8/2005 | Kageyama et al. ........... 348/349 |
| 2005/0185086 A1 * | 8/2005 | Onozawa ....................... 348/349 |
| 2010/0007718 A1 | 1/2010 | Rohaly, Jr. et al. |

FOREIGN PATENT DOCUMENTS

| JP | 2009-168995 A | 7/2009 |
| JP | 2009-527007 A | 7/2009 |
| JP | 2009175528 A | 8/2009 |

OTHER PUBLICATIONS

Notice of Reasons for Rejection, dated Jun. 28, 2013, issued in corresponding JP Application No. 2010-062871, 9 pages in English and Japanese.

* cited by examiner

*Primary Examiner* — Christopher S Kelley
*Assistant Examiner* — Christopher Findley
(74) *Attorney, Agent, or Firm* — Sughrue Mion, PLLC

(57) ABSTRACT

A stereoscopic imaging apparatus which uses contrast AF to obviate disadvantages of phase-difference AF, shorten processing time of contrast AF, and improve focusing accuracy. A phase-difference CCD in which object images having passed through different regions in a predetermined direction of a single photographing optical system are pupil-split and imaged subjects the object images having passed through the respective regions to photoelectric conversion to obtain a main pixel image and a sub-pixel image which have a mutual phase difference. Contrast AF is performed using only one of the main pixel image and the sub-pixel image. Which one of the main pixel image and the sub-pixel image will be used for the contrast AF is determined depending on whether the position of an AF area in the angle of view belongs to a main pixel AF area or a sub-pixel AF area.

10 Claims, 16 Drawing Sheets (MAIN PIXEL)

(SUB-PIXEL)

GENERAL PIXEL

PHASE-DIFFERENCE PIXEL

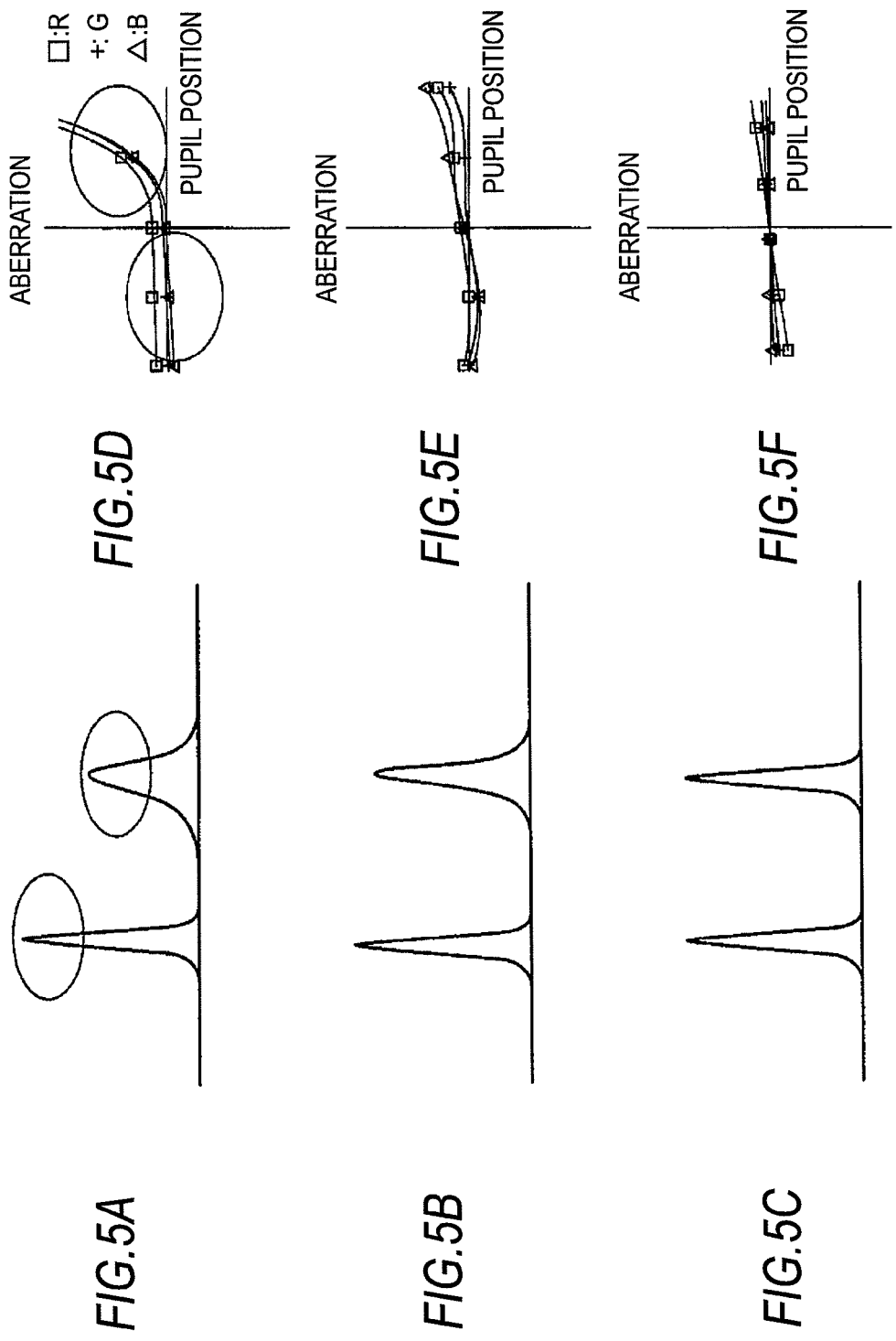

IMAGING APPARATUS

BACKGROUND OF THE INVENTION

1. Field of the Invention

The present invention relates to a stereoscopic imaging apparatus, and more particularly, to a technique in which object images having passed through different regions in a predetermined direction of a photographing optical system are imaged onto image sensors to obtain a left viewpoint image and a right viewpoint image.

2. Description of the Related Art

Conventionally, a stereoscopic imaging apparatus having an optical system as shown in FIG. 15 is known in the art (see JP2009-527007A).

This optical system has a configuration in which object images having passed through different regions in the horizontal direction of a main lens 1 and a relay lens 2 are pupil-split by a mirror 4 and are imaged onto image sensors 7 and 8 through imaging lenses 5 and 6, respectively.

FIGS. 16A to 16C show separate states of an image imaged onto an image sensor depending on a difference between front-focus, in-focus (best focus), and back-focus. Note that, in order to compare the difference in the separate state with the focusing, the mirror 4 shown in FIG. 15 is omitted in FIGS. 16A to 16C.

Among the pupil-split images, images that are in focus as shown in FIG. 16B are imaged (match) at the same position on the image sensor, whereas images that are front and back focused shown in FIGS. 16A and 16C are imaged (separate) at different positions on the image sensor.

Therefore, by obtaining object images which are pupil-split in the horizontal direction using the image sensors 7 and 8, it is possible to obtain a left viewpoint image and a right viewpoint image (namely, 3D image) of which the parallaxes are different depending on an object distance.

Moreover, JP2009-168995A discloses an imaging apparatus which acquires a left viewpoint image and a right viewpoint image corresponding to object images which are pupil-split in the horizontal direction similarly to the above and performs focus detection (detection of a defocus amount) with respect to approximately the entire area of a photographic screen.

SUMMARY OF THE INVENTION

According to the invention disclosed in JP2009-168995A, even when any area of the photographic screen is set as an AF area, it is possible to calculate a defocus amount from the phase difference between the left viewpoint image and the right viewpoint image within the AF area. It is also possible to perform autofocus adjustment (phase-difference AF) based on a phase difference detection method. Particularly, since the use of the phase-difference AF method enables the focusing position (defocus amount) to be detected without moving a focusing lens, it has advantages that the focusing position can be detected faster than a contrast AF method in which the contrast of an image is detected while moving the focusing lens, and the position of the focusing lens is controlled to maximize the contrast. Moreover, in the stereoscopic imaging apparatus of the related art, since images (left viewpoint image and right viewpoint image) for phase-difference AF are obtained in advance, the contrast AF will not be performed.

However, since the phase-difference AF method performs focus detection from the phase difference between the respective images, the phase-difference AF method has a problem in that the focusing accuracy decreases if noise, ghosting, smear, or the like is included in the image.

Moreover, the left viewpoint image and the right viewpoint image corresponding to the object images which are pupil-split in the horizontal direction have different features, such as in terms of contrast, shading amount, focus position, near an angle of view. Therefore, the phase-difference AF method has a problem in that the focusing accuracy decreases if the AF area is set near the angle of view.

An object of the invention is to provide a stereoscopic imaging apparatus which uses contrast AF to obviate disadvantages of phase-difference AF, with shorten processing time of contrast AF and improved focusing accuracy.

Another object of the invention is to provide a stereoscopic imaging apparatus which uses both contrast AF and phase-difference AF to selectively use the optimum AF method, thus accelerating AF processing and improving the focusing accuracy.

In order to attain the objects, according to a first aspect of the invention, there is provided a stereoscopic imaging apparatus including: a single photographing optical system; an image sensor for forming images from pupil-split object images which had passed through a first and a second regions of the photographing optical system with each region in a predetermined different direction, and the image sensor photo-electrically converts the object images which had passed through the first and the second regions to output a first image and a second image; an AF image selecting part for selecting the image from the first or second images to be used for contrast AF; and a contrast AF controlling part for controlling the positions of a lens in the photographing optical system by using the image selected with the AF image selecting part in order to maximize an image contrast in a predetermined AF area of the image. Note that, "maximum" as used herein refers not only to the maximum value of contrast but also to values near the maximum value.

According to the first aspect of the invention, by performing contrast AF in a stereoscopic imaging apparatus which acquires first and second images (left and right viewpoint images) representing the object images which are pupil-split in a predetermined direction of a photographing optical system, it is possible to perform AF control wherein it is unlikely to be affected by noise or the like included in an image in an AF area and to improve focusing accuracy. Moreover, since either one of the first and the second images is selected as an image for contrast AF by the AF image selecting part, and contrast AF is performed based on the selected image, it is possible to shorten the processing time of the contrast AF including an image readout time or the like.

In the stereoscopic imaging apparatus of the first aspect, it is preferable that in the AF image selecting part, information which is used to select an image corresponding to an object image that passes through a region having a smaller aberration among the first and the second regions in the predetermined direction of the photographing optical system is set in advance according to the selected photographing optical system. In general, since a lens aberration (performance) is different at respective pupil positions in the predetermined direction of the photographing optical system, information which is used to select an image having a smaller aberration is set in advance in the AF image selecting part, so that the image for contrast AF is selected using this information.

In the stereoscopic imaging apparatus of the first aspect, it is preferable that the stereoscopic imaging apparatus further includes a detecting part for detecting the position of a main object within an angle of view; and an AF area determining part for determining the predetermined AF area based on the detected position of the main object within the angle of view. As the detecting part that detects the position of the main object in the angle of view, an existing face detecting part that analyzes at least one of the first and the second images obtained from the image sensor to detect a main object (for example, the face or the like of a person), an existing line-of-sight input section that detects the line of sight of a photographer, or the like can be used.

In the stereoscopic imaging apparatus of the first aspect, it is preferable that the stereoscopic imaging apparatus further includes an AF area determining part for determining an arbitrary area within a photographed angle of view as the predetermined AF area. As the AF area determining part, a determining part that transfers a target mark on a monitor displaying an image obtained from the image sensor at a certain position to determine an AF area, a determining part that determines an AF area by a touch position in a touch panel on the monitor, or the like can be used.

In the stereoscopic imaging apparatus of the first aspect, it is preferable that the stereoscopic imaging apparatus further includes an area setting section for dividing entire area of the image photographed by the image sensor into left and right to set the divided area as a first area and a second area, wherein the AF image selecting part selects the image for contrast AF depending on which one of the first and the second areas set by the area setting section belongs to the position of the AF area determined by the AF area determining part.

The first and the second images may sometimes have different contrasts or different focus positions near the angle of view, and which one of the images is suitable for the AF processing can be identified. Thus, the image for contrast AF is selected depending on which angle of view in the horizontal direction the determined AF area belongs to.

In the stereoscopic imaging apparatus of the first aspect, it is preferable that the AF image selecting part selects an image having a larger exposure amount among the first and the second images within the AF area determined by the AF area determining part as the image for contrast AF. This is because the image having a larger exposure amount has high contrast and results in high focusing accuracy at the time of contrast AF.

In the stereoscopic imaging apparatus of the first aspect, it is preferable that the stereoscopic imaging apparatus further includes a detecting part for detecting luminance of the object within the determined AF area, and either one of the first and the second images in the AF area is used as the image for contrast AF when the detected luminance of the object is equal to or higher than a predetermined threshold value, and a combined image of the first and the second images in the AF area is used as the image for contrast AF when the detected luminance of the object is lower than the predetermined threshold value. When the luminance of the object in the determined AF area is low (dark), a combined image of the two images is used as the image for contrast AF.

In order to attain the objects, according to a second aspect of the invention, there is provided a stereoscopic imaging apparatus including: a single photographing optical system; an image sensor for forming images from pupil-split object images which had passed through a first and a second regions of the photographing optical system with each region in a predetermined different direction, and the image sensor photo-electrically converts the object images which had passed through the first and the second regions to output a first image and a second image; and a contrast AF controlling part for calculating a first lens position and a second lens position of a focusing lens in the photographing optical system at which image contrast in a predetermined AF area of each of the first and the second images amounts to a maximum using the first and the second images and transfers the focusing lens in the photographing optical system to an intermediate position of the first and the second lens positions.

According to the second aspect of the invention, the focusing lens in the photographing optical system is transferred to the intermediate position of the first and the second lens positions calculated based on the first and the second images in the AF area. Therefore, it is possible to equalize the focusing accuracy of the first and the second images (that is, prevent blurring) and to obtain favorable left and right viewpoint images (stereoscopic image).

In order to attain the objects, according to a third aspect of the invention, there is provided a stereoscopic imaging apparatus including: a single photographing optical system; an image sensor for forming images from pupil-split object images which had passed through a first and a second regions of the photographing optical system with each region in a predetermined different direction, and the image sensor photo-electrically converts the object images which had passed through the first and the second regions to output a first image and a second image; a contrast AF controlling part for calculating a first lens position and a second lens position of a focusing lens in the photographing optical system at which image contrast in a predetermined AF area of each of the first and the second images amounts to a maximum using the first and the second images and transfers the focusing lens sequentially to the first and the second lens positions; and a photography controlling part for taking photograph each time the focusing lens in the photographing optical system transfers to the first and the second lens positions.

According to the third aspect of the invention, photographing is performed while moving the focusing lens in the photographing optical system to the first and the second lens positions calculated based on the first and the second images in the AF area. Thus, it is possible to obtain the first and the second images with high focusing accuracy.

In the stereoscopic imaging apparatus of the third aspect, it is preferable that the contrast AF controlling part causes the focusing lens in the photographing optical system to conduct search-operation from the close side to the infinite side or from the infinite side to the close side to calculate the first and the second lens positions, and at each photographing of the photography controlling part, transferring the focusing lens in the photographing optical system sequentially from the first or second lens position which is closer to a lens position of the focusing lens in the photographing optical system after the search-operation.

With this configuration, it is possible to obviate unnecessary transferring of the focusing lens in the photographing optical system after contrast AF is performed so as to calculate the first and the second lens positions and before photographing is performed at the respective lens positions. Thus, the photographing operation can be performed without delay.

In the stereoscopic imaging apparatus of the third aspect, it is preferable that when only one of the first and the second lens positions of the focusing lens is detected, the contrast AF controlling part transfers the focusing lens in the photographing optical system only to the detected lens position.

In order to attain the objects, according to a fourth aspect of the invention, there is provided a stereoscopic imaging apparatus including: a single photographing optical system; an image sensor for forming images from pupil-split object images which had passed through a first and a second regions of the photographing optical system with each region in a predetermined different direction, and the image sensor photo-electrically converts the object images which had passed through the first and the second regions to output a first image and a second image; a contrast AF controlling part for controlling a lens position of a focusing lens in the photographing optical system by using at least one of the first and the second images as an image for contrast AF in order to maximize an image contrast in a predetermined AF area in the image; a defocus amount calculating part for calculating a defocus amount of the photographing optical system based on respective images in the predetermined AF area of the first and the second images; a phase-difference AF controlling part for controlling the lens position of the focusing lens in the photographing optical system so that the defocus amount calculated by the defocus amount calculating part becomes 0; and an AF control method selecting part for selecting which one of an AF control method by the contrast AF controlling part and an AF control method by the phase-difference AF controlling part to be used. Note that, the defocus amount of "0" as used herein refers to not only the value 0 but also approximate values to the number 0.

According to the fourth aspect of the invention, it is possible to use both contrast AF and phase-difference AF in a stereoscopic imaging apparatus to selectively use the optimum AF method, thus accelerating AF processing and improving focusing accuracy.

In the stereoscopic imaging apparatus of the fourth aspect, it is preferable that the stereoscopic imaging apparatus further includes a detecting part for detecting the position of a main object in an angle of view; and an AF area determining part for determining the predetermined AF area based on the detected position of the main object in the angle of view.

In the stereoscopic imaging apparatus of the fourth aspect, it is preferable that the stereoscopic imaging apparatus further includes an AF area determining part for determining an arbitrary area in a photographic angle of view as the predetermined AF area.

In the stereoscopic imaging apparatus of the fourth aspect, it is preferable that the AF control method selecting part selects the AF control method by the phase-difference AF controlling part when the AF area determined by the AF area determining part is the central area in a photographic angle of view and selects the AF control method by the contrast AF controlling part when the determined AF area is the surrounding area in the photographic angle of view.

With this configuration, by selectively using the phase-difference AF and the contrast AF, it is possible to accelerate the AF processing and prevent focusing accuracy from decreasing near the angle of view.

In the stereoscopic imaging apparatus of the fourth aspect, it is preferable that the AF control method selecting part selects the AF control method by the phase-difference AF controlling part when a luminance of the object of the AF area determined by the AF area determining part is equal to or higher than a predetermined luminance and selects the AF control method by the contrast AF controlling part when the luminance of the object is lower than the predetermined luminance.

With this configuration, by selectively using the phase-difference AF and the contrast AF, it is possible to accelerate the AF processing and achieve AF control wherein it is unlikely to be affected by noise or the like included in a low-luminance object.

In the stereoscopic imaging apparatus of the fourth aspect, it is preferable that the defocus amount calculating part calculates the defocus amount based on a phase difference between respective images at which the maximum correlation value (the term correlation here represents the similarity of images derived through comparison of two images, and for example, is derived by a difference between the maximum peak values of waveform data) is obtained between the respective images in the predetermined AF area of the first and the second images, and the AF control method selecting part selects the AF control method by the phase-difference AF controlling part when the obtained maximum correlation value is higher than a predetermined value (for example, when the difference between the maximum peak values of waveform data is within the range of ±20%) and selects the AF control method by the contrast AF controlling part when the obtained maximum correlation value is lower than the predetermined value (for example, when the difference between the maximum peak values of waveform data is out of the range of ±20%).

With this configuration, by selectively using the phase-difference AF and the contrast AF, it is possible to accelerate the AF processing and improve focusing accuracy in a scene where the correlation value is lower than a predetermined value.

In the stereoscopic imaging apparatus of the fourth aspect, it is preferable that the AF control method selecting part detects a difference between the exposure amounts of the first and the second images in the determined AF area, selects the AF control method by the phase-difference AF controlling part when the detected difference in exposure amount is smaller than a predetermined value, and selects the AF control method by the contrast AF controlling part when the detected difference in exposure amount is larger than the predetermined value. Note that, the "difference in exposure amount (B)" as used herein is calculated by the percentage of the degree of increase or decrease of the exposure amount (Y) of the second image with respect to the exposure amount (X) of the first image. Specifically, the difference in exposure amount (B (%)) is calculated by (X−Y)/X×100. Moreover, the "predetermined value (C)" of the difference in exposure amount can be set to an arbitrary value. For example, if C≤±10%, when the detected difference in exposure amount is smaller than the predetermined value, namely B≤±10%, the phase-difference AF is selected. On the other hand, when the difference in exposure amount is larger than the predetermined value, namely B≥±10%, the contrast AF is selected. Thus, it is possible to selectively use an advantageous AF method.

With this configuration, by selectively using the phase-difference AF and the contrast AF, it is possible to accelerate the AF processing and achieve AF control wherein it is unlikely to be affected by ghosting or the like.

In the stereoscopic imaging apparatus of the first to fourth aspects, it is preferable that the image sensor includes first and second groups of pixels for photoelectric conversion which are arranged in a matrix form over approximately the entire exposure region of the image sensor, the first group of pixels having limits to the direction of receiving light beams to receive only an object image having passed through the first region of the photographing optical system, and the second group of pixels having limits to the direction of receiving light beams to receive only an object image having passed through the second region of the photographing optical system, and the image sensor is capable of reading out the first and the second images from the first and the second groups of pixels.

With this configuration, it is possible to further decrease the size of a stereoscopic imaging apparatus more than a stereoscopic imaging apparatus using a plurality of image sensors.

As described above, according to the present invention, since contrast AF is used in the stereoscopic imaging apparatus, it is possible to obviate disadvantages of phase-difference AF used in a general stereoscopic imaging apparatus. In addition, since both contrast AF and phase-difference AF are used in the stereoscopic imaging apparatus, and the two AF methods are selectively performed in accordance with the situation at the time of photographing, it is possible to accelerate AF processing and improve focusing accuracy.

BRIEF DESCRIPTION OF THE DRAWINGS

FIGS. 5A to 5F show the relationship between a dot images obtained from the main pixel and sub-pixels of the phase-difference CCD and a lens aberration.

DESCRIPTION OF THE PREFERRED EMBODIMENTS

Hereinafter, embodiments of a stereoscopic imaging apparatus according to the present invention will be described with reference to the accompanying drawings.

Overall Configuration of Imaging Apparatus

Figure 1:
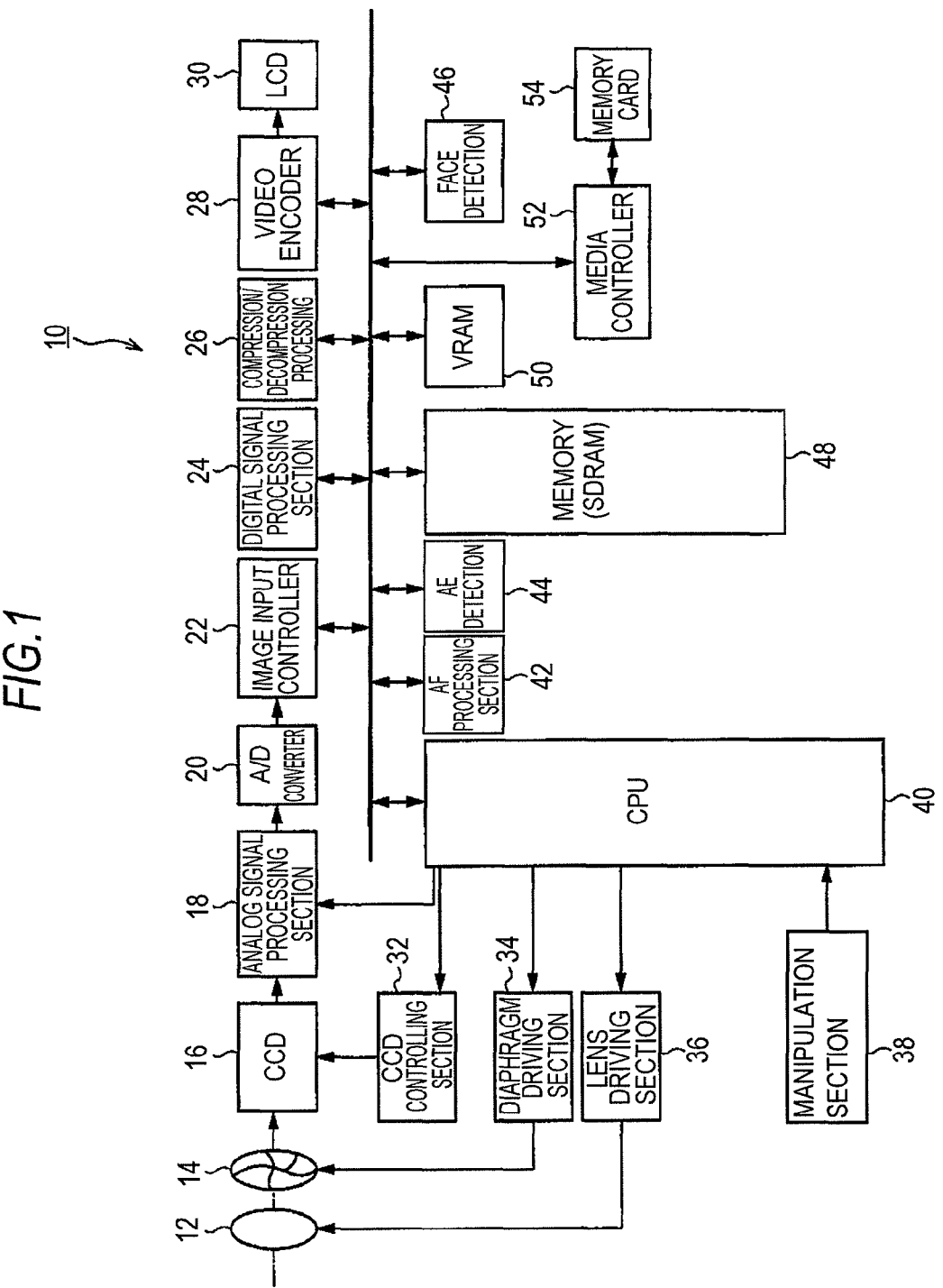
FIG. 1 is a block diagram showing an embodiment of a stereoscopic imaging apparatus according to the present invention.

FIG. 1 is a block diagram showing an embodiment of a stereoscopic imaging apparatus 10 according to the present invention.

The stereoscopic imaging apparatus 10 records photographed images in a memory card 54, and an overall operation of the apparatus is controlled by a central processing unit (CPU) 40.

The stereoscopic imaging apparatus 10 has an manipulation section 38 such as, for example, a shutter button, a mode dial, a playback button, a MENU/OK key, a cross key, and a BACK key. Signals from the manipulation section 38 are input to the CPU 40. Then, the CPU 40 controls circuits in the stereoscopic imaging apparatus 10 based on the input signals to perform various controlling such as, for example, lens driving control, diaphragm driving control, photograph operation control, image processing control, recording/playback control of image data, and display control of a stereoscopic liquid crystal monitor 30.

The shutter button is an manipulation button for inputting an instruction to start photographing and is configured by a two-stroke switch which has an S1 switch that is switched ON by a half push and an S2 switch that is switched ON by a full push. The mode dial is a selecting part that selects one of the following photography modes: an auto mode for capturing still pictures, a manual mode, a scene mode for photographing persons, landscapes, night scenes, and a motion picture mode for capturing motion pictures.

The playback button is a button for switching to a playback mode to display still pictures or motion pictures of the stereoscopic images (3D images) and planar images (2D images) which have been captured and recorded. The MENU/OK key is an manipulation key which serves as a menu button for issuing an instruction to display a menu on the screen of the liquid crystal monitor 30 and also serves as an OK button for issuing an instruction to confirm and execute a selected content. The cross key is an manipulation section that inputs an instruction as to the four directions up, down, left, and right and serves as a button (a cursor transferring manipulation section) for selecting an item from the menu screen and instructing the selection of various setting items from each menu. Moreover, the up/down key of the cross key serves as a zoom switch at the time of photographing or a playback zoom switch in the playback mode, and the left/right key serves as a page scroll (forward/backward scroll) button in the playback mode. The BACK key is used to delete a desired item such as a selected item and cancel an instruction or return to a previous manipulation state.

In the photography mode, an image light representing an object is imaged onto a light receiving surface of a solid-state image sensor 16 (hereinafter referred to as a "phase-difference CCD") which is a phase-difference image sensor through a photographing optical system (zoom lens) 12 and a diaphragm 14. The photographing optical system 12 is driven by a lens driver 36 that is controlled by the CPU 40 and controls focusing, zooming, and the like. The diaphragm 14 is made up of five aperture leaf blades, for example, and driven by a diaphragm driver 34 that is controlled by the CPU 40. For example, the diaphragm 14 is controlled in five steps of the aperture value (AV) from F2.8 to F11 on an AV basis.

The CPU 40 controls the diaphragm 14 using the diaphragm driver 34 and also controls a charge storage time (shutter speed) in the phase-difference CCD 16 and readout of image signals from the phase-difference CCD 16 using a CCD controller 32.

Configuration Example of Phase-Difference CCD

Figure 2A:
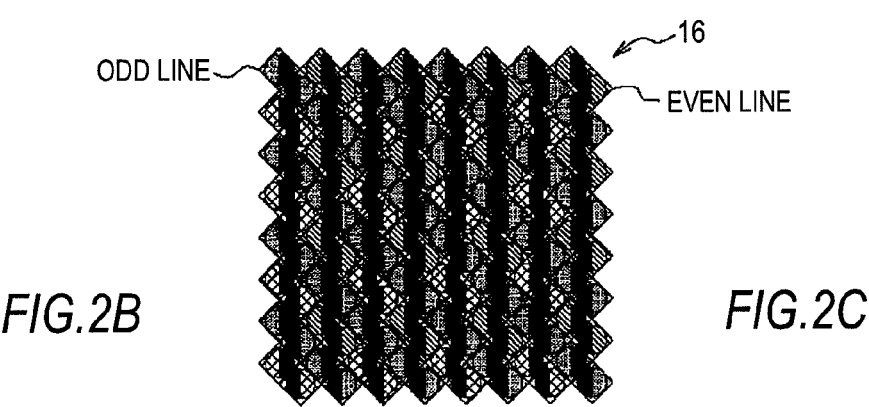
FIGS. 2A to 2C show configuration examples of a phase-difference CCD.
Figure 2B:
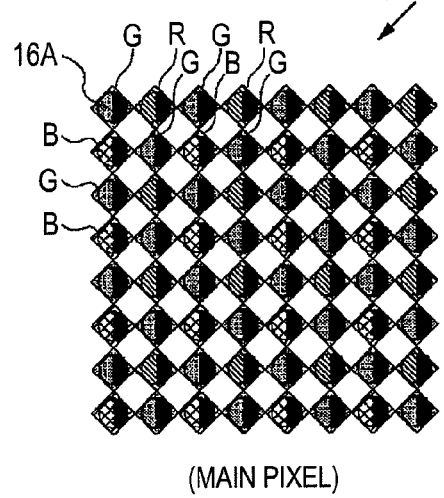
Figure 2C:
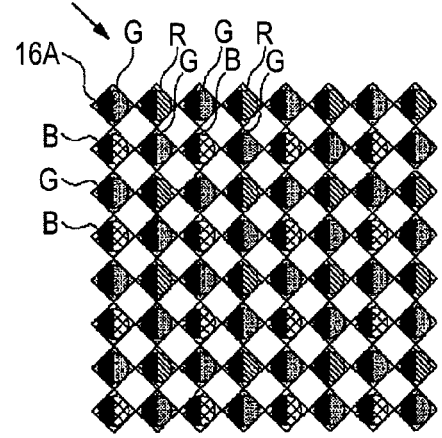

FIGS. 2A to 2C show configuration examples of the phase-difference CCD 16.

The phase-difference CCD 16 has odd-line pixels (main pixels) and even-line pixels (sub-pixels) each being arranged in a matrix form, so that two frames of image signals having been subjected to photoelectric conversion in these main and sub-pixels can be independently read out.

As shown in FIGS. 2A to 2C, on the odd lines (1, 3, 5, . . . ) of the phase-difference CCD 16, among the pixels having color filters of R (red), G (green), and B (blue), a line of a pixel arrangement of G, R, G, R and a line of a pixel arrangement of B, G, B, G are alternately arranged. On the other hand, on the even lines (2, 4, 6, . . . ), similarly to the odd lines, a line of a pixel arrangement of G, R, G, R and a line of a pixel arrangement of B, G, B, G are alternately arranged. The pixels on the odd lines are shifted in the arrangement direction by an amount of ½ pitch with respect to the pixels on the even lines.

Figure 3:
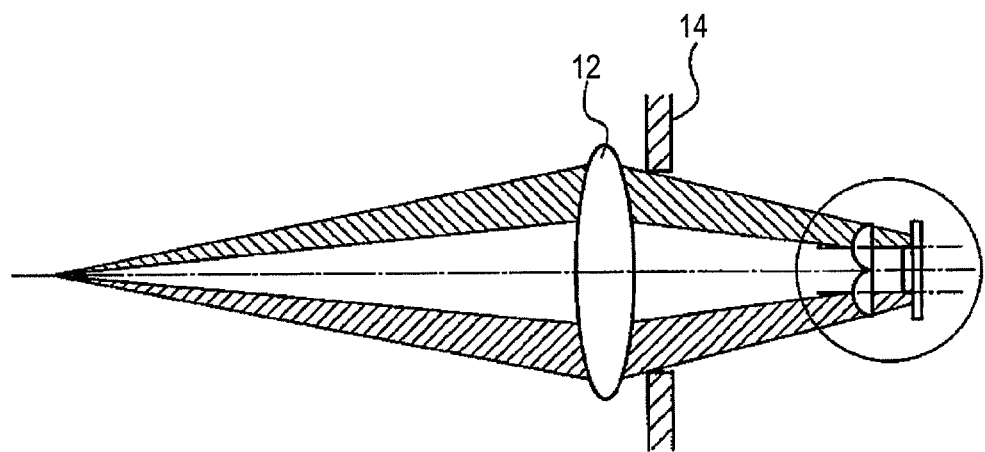
FIG. 3 shows a photographing optical system and one main pixel and one sub-pixel of the phase-difference CCD.
Figure 4A:
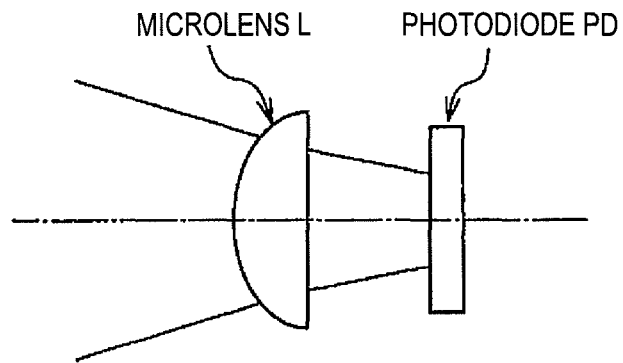
FIGS. 4A and 4B show a main part of FIG. 3 in an enlarged scale.
Figure 4B:
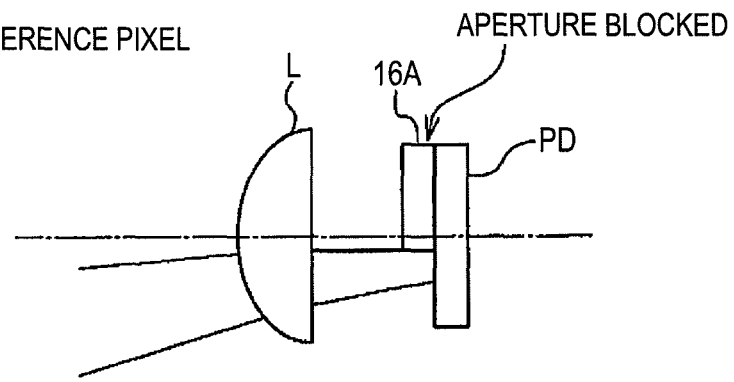

FIG. 3 shows the photographing optical system 12, the diaphragm 14, and one main pixel and one sub-pixel of the phase-difference CCD 16, and FIGS. 4A and 4B show a main part of FIG. 3 in an enlarged scale.

As shown in FIG. 4A, in a general CCD, light beams passing through an exiting pupil enter the pixel (photodiode PD) through a micro-lens L without being blocked.

In contrast, a light shielding member 16A is formed on the light receiving surface of the main pixel and sub-pixel of the phase-difference CCD 16. The light shielding member 16A shields the right or left half of the light receiving surface of the main pixel and sub-pixel (photodiode PD). That is, the light shielding member 16A functions as a pupil splitting member.

In the phase-difference CCD 16 described above, although the region (the right or left half) where light beams are blocked by the light shielding member 16A is different from main pixel to sub-pixel, the present invention is not limited to this. For example, the light shielding member 16A may not be provided, and the microlens L and the photodiode PD may be shifted relative to each other in the horizontal direction so that light beams entering the photodiode PD are limited in accordance with the shifting direction. Moreover, one micro-lens may be provided for two pixels (main pixel and sub-pixel) so that light beams entering each pixel are limited.

Returning to FIG. 1, the signal charge stored in the phase-difference CCD 16 is read out as a voltage signal corresponding to the signal charge based on a readout signal supplied from the CCD controller 32. The voltage signal read out from the phase-difference CCD 16 is supplied to an analog signal processing section 18, in which the R, G, and B signals for each pixel are subjected to sample-and-hold processing and amplification and are then supplied to an A/D converter 20. The A/D converter 20 converts the R, G, and B signals supplied sequentially into digital R, G, and B signals and outputs them to an image input controller 22.

A digital signal processing section 24 performs predetermined signal processing on the digital image signals input through the image input controller 22. The signal processing may include offset processing, gain control processing (for example, white balance correction and sensitivity correction), gamma-correction processing, and YC processing.

Here, as shown in FIGS. 2B and 2C, main pixel image data read out from the main pixels on the odd lines of the phase-difference CCD 16 are processed as left viewpoint image data, and sub-pixel image data read out from the sub-pixels on the even lines are processed as right viewpoint image data.

The left viewpoint image data and right viewpoint image data (3D image data) processed by the digital signal processing section 24 are input to a VRAM 50. The VRAM 50 includes an A region and a B region in which 3D image data representing 3D images corresponding to one page are stored. In the VRAM 50, the 3D image data representing the 3D images corresponding to one page are alternately overwritten to the A and B regions. Among the A and B regions of the VRAM 50, 3D image data being overwritten are read out from a region other than the region where 3D image data are overwritten. The 3D image data read out from the VRAM 50 are encoded by a video encoder 28 and output to the stereoscopic liquid crystal monitor 30 provided on the rear side of a camera. In this way, the 3D object image is displayed on the display screen of the liquid crystal monitor 30.

Although the liquid crystal monitor 30 is a stereoscopic display section capable of displaying stereoscopic images (left viewpoint image and right viewpoint image) as directional images having predetermined directivity with aid of a parallax barrier, the present invention is not limited to this. For example, the liquid crystal monitor 30 may be one which uses a lenticular lens and one which enables users to see the left viewpoint image and right viewpoint image by wearing special glasses such as polarization glasses or liquid crystal shutter glasses.

When the shutter button of the manipulation section 38 is at the first pressed stage (half push), the phase-difference CCD 16 starts an AF operation and an AE operation so that the focusing lens in the photographing optical system 12 is controlled so as to be at the focusing position by the lens driver 36. Moreover, when the shutter button is at the half push state, the image data output from the A/D converter 20 are taken into an AE detecting part 44.

The AE detecting part 44 integrates the G signals of the whole screen or integrates the G signals with a different weighting factor applied to the central portion of the screen and the surrounding portion and outputs the integrated value to the CPU 40. Then, the CPU 40 calculates the brightness (photographic Ev value) of an object from the integrated value input from the AE detecting part 44. Based on the photographic Ev value, the CPU 40 determines the aperture value of the diaphragm 14 and the electronic shutter (shutter speed) of the phase-difference CCD 16 in accordance with a predetermined programmed diagram. Finally, the CPU 40 controls the diaphragm 14 using the diaphragm driver 34 based on the determined aperture value and controls the charge storage time in the phase-difference CCD 16 using the CCD controller 32 based on the determined shutter speed.

The AF processing section 42 is a section that performs contrast AF processing or phase-difference AF processing. When the contrast AF processing is performed, the AF processing section 42 extracts high-frequency components of image data in a predetermined focus region among at least one of the left viewpoint image data and the right viewpoint image data and integrates the high-frequency components to calculate an AF estimate representing a focused state. Then, the focusing lens in the photographing optical system 12 is controlled to maximize the AF estimate amounts, whereby the AF control is performed. On the other hand, when the phase-difference AF processing is performed, the AF processing section 42 detects a phase difference between image data corresponding to the main pixel and sub-pixel in a predetermined focus region among the left viewpoint image data and right viewpoint image data and calculates a defocus amount based on information representing the phase difference. Then, the focusing lens in the photographing optical system 12 is controlled so that the defocus amount becomes 0, whereby the AF control is performed.

When the AE operation and the AF operation are finished, and the shutter button is at the second pressed stage (full push), in response to the pressing, the two pieces of image data of the left viewpoint image (main pixel image) and the right viewpoint image (sub-pixel image) corresponding to the main pixel and sub-pixel output from the A/D converter 20 are input from the image input controller 22 to a memory (SDRAM) 48 and temporarily stored therein.

The two pieces of image data temporarily stored in the memory 48 are appropriately read out by the digital signal processing section 24, in which the read image data are subjected to predetermined signal processing such as generation processing (YC processing) of luminance data and chromaticity data of the image data. The image data (YC data) having been subjected to YC processing are stored in the memory 48 again. Subsequently, the two pieces of YC data are output to a compression/decompression processing section 26 and subjected to predetermined compression processing such as JPEG (Joint Photographic Experts Group) and are then stored in the memory 48 again.

From the two pieces of YC data (compressed data) stored in the memory 48, a multipicture file (MP file: a file format wherein a plurality of images are connected) is generated, and the MP file is read out by a media controller 52 and recorded in a memory card 54.

First Embodiment

The stereoscopic imaging apparatus 10 of the first embodiment of the present invention has a function of finding out a focus point of a main object such as a person to perform AF processing. For this kind of function, existing functions can be used. For example, a function in which when a face detection mode is selected, the face of a person in a photographic angle of view is detected by a face detection circuit 46 (FIG. 1), and focus is automatically placed on the face with an area including the face used as an AF area, and a function in which when a line-of-sight input mode is selected, the line of sight of a photographer is detected, whereby a focus point is determined, and focus is placed on the focus point (see JP-H09-101579A (JP1997-101579A) and JP2004-7158A) may be used.

The stereoscopic imaging apparatus 10 also has a function of designating an arbitrary area within a photographic angle of view as an AF area. For this kind of function, existing functions can be used. For example, a function in which the liquid crystal monitor 30 is configured as a monitor having a touch panel, and an arbitrary touch position on the touch panel on a monitor is designated as an AF area, and a function in which a target mark or the like is transferred to a desired position on the monitor and designated as an AF area may be used.

In the first embodiment, the AF processing section 42 shown in FIG. 1 functions as a section that performs contrast AF processing. That is, the AF processing section 42 extracts high-frequency components of image data of the main pixel or sub-pixel in the AF area, which is automatically determined in the face detection mode or the like or which is manually detected using a touch panel or the like, using a high-pass filter or a band-pass filter, integrates the extracted high-frequency components to calculate an AF estimate representing the focused state, and outputs the AF estimate to the CPU 40.

When the shutter button is pressed halfway, the CPU 40 performs contrast AF control. That is, the CPU 40 controls the lens driver 36 to cause a focusing lens (not shown) in the photographing optical system 12 to conduct search-operation from the close side to the infinite side and acquires AF estimates calculated by the AF processing section 42 at each lens position. Then, a lens position at which the AF estimate amounts to the maximum is calculated from these acquired AF estimates, and the focusing lens is transferred to the calculated lens position.

Next, which one of the image data of the main pixel and sub-pixel will be used at the time of the contrast AF will be described.

FIGS. 5D to 5F are illustrations showing an example of an aberration of a photographing optical system, in which the horizontal axis represents the pupil position, and the vertical axis represents an aberration.

A photographing optical system has aberrations such as spherical aberration, chromatic aberration, coma aberration, astigmatism, field curvature. In the stereoscopic imaging apparatus 10, the image data of the main pixel and sub-pixel are acquired from the object images which are pupil-split in the horizontal direction (the object images having passed through different regions in the horizontal direction of the photographing optical system). Therefore, an aberration appearing in the horizontal direction of the photographing optical system affects the quality of the image data of the main pixel and sub-pixel.

FIGS. 5A to 5C show examples of the dot images of the main pixel and sub-pixel from a stereoscopic imaging apparatus having the photographing optical systems shown in FIGS. 5D to 5F.

As shown in FIG. 5C, in the case of a photographing optical system having aberration as shown in FIG. 5F, the aberration has little influence on the peak or tilt of the dot images of the main pixel and sub-pixel, whereas in the case of a photographing optical system having aberration as shown in FIG. 5D, the aberration has a great influence on the peak or spreading (PSF) of the dot images of the main pixel and sub-pixel.

That is, high focusing accuracy can be obtained when image data obtained from an object image having passed through a region having a smaller aberration among the object images having passed through the different regions in the horizontal direction of the photographing optical system are used for the contrast AF.

Therefore, in the first embodiment, the aberration of the photographing optical system 12 is examined before shipment to determine which one of the image data of the main pixel and sub-pixel will be used for the contrast AF, and the determination result (information which is used to select an image corresponding to an object image that passes through a region having a smaller aberration among the respective regions in the predetermined direction of the photographing optical system 12) is written to a nonvolatile memory (not shown) in the apparatus.

The CPU 40 reads out only one of the image data of the main pixel and sub-pixel from the phase-difference CCD 16 based on the information written to the nonvolatile memory at the time of performing the contrast AF and uses the read information in the contrast AF.

As described above, the image data of the main pixel and sub-pixel can be independently read out from the phase-difference CCD 16. However, according to the stereoscopic imaging apparatus 10 of the first embodiment, since only one of the image data of the main pixel and sub-pixel are read at the time of performing the contrast AF, it is possible to shorten the processing time of the contrast AF including the readout time of the image data. Moreover, since the image data having a smaller aberration are selected in advance and read out, it is possible to increase focusing accuracy of the contrast AF.

Second Embodiment

Figure 6A:
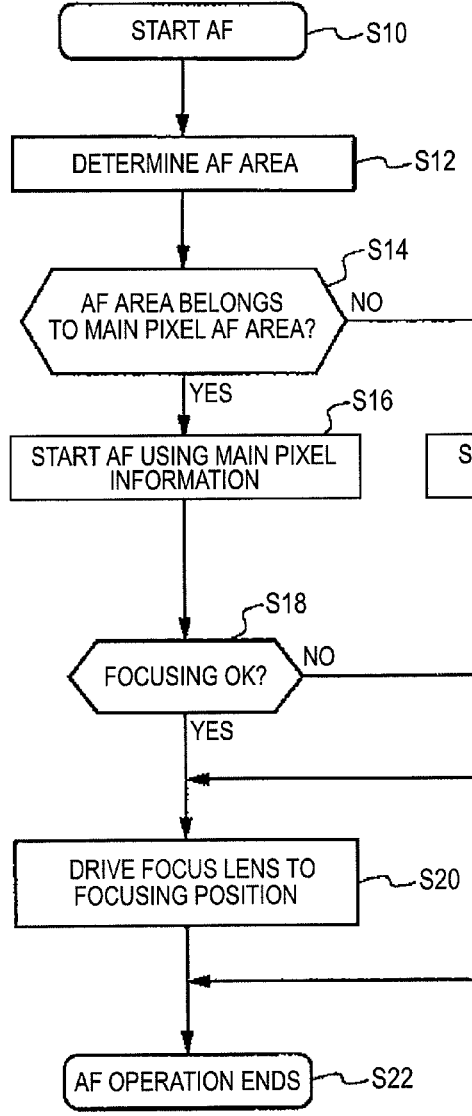
FIG. 6A is a flowchart of an AF operation in a stereoscopic imaging apparatus of a second embodiment of the present invention.

FIG. 6A is a flowchart of an AF operation in a stereoscopic imaging apparatus 10 of a second embodiment of the present invention.

When the shutter button is pressed halfway, the CPU 40 starts an AF operation (step S10).

The CPU 40 determines an AF area when the AF operation starts (step S12). As described above, the AF area is automatically determined or manually set in accordance with the position or the like of a main object within the photographic angle of view.

Subsequently, it is determined whether the determined AF area belongs to an area (main pixel AF area) where contrast AF is performed using a main pixel image or an area (sub-pixel AF area) where contrast AF is performed using a sub-pixel image (step S14).

Figure 6B:
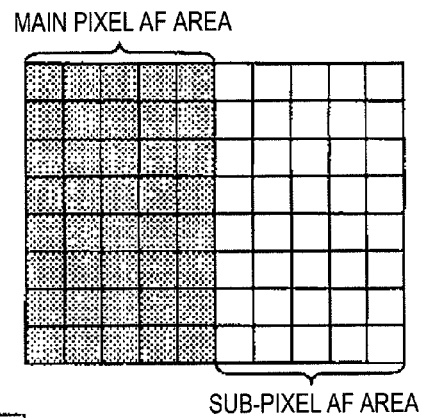
FIG. 6B shows a main pixel AF area and a sub-pixel AF area.

Here, the main pixel AF area and the sub-pixel AF area are determined in advance as shown in FIG. 6B.

FIG. 6B shows 80 AF areas which divide a whole phase-difference CCD into 8×10 areas. In the second embodiment, the left half area of FIG. 6B is determined as the main pixel AF area, and the right half area is determined as the sub-pixel AF area. The main pixel image and the sub-pixel image have different contrast, luminance, and the like in areas near the photographic angle of view, and which one of the images is not suitable can be identified in advance. Thus, the main pixel AF area and the sub-pixel AF area are determined in advance.

When the determined AF area belongs to the main pixel AF area ("YES"), the contrast AF is started using the main pixel image in the AF area (step S16).

That is, the CPU 40 controls the lens driver 36 to cause a focusing lens (not shown) in the photographing optical system 12 to conduct search-operation from the close side to the infinite side and acquires AF estimates calculated by the AF processing section 42 at each lens position based on the main pixel image in the AF area. From these acquired AF estimates, the CPU 40 calculates the maximum value of the AF estimates and the lens position at which the AF estimate amounts to the maximum.

It is determined whether or not the calculated maximum AF estimate is larger than a predetermined threshold value (whether or not focusing is OK). If the focusing is OK ("YES"), the focusing lens is transferred to the lens position (focusing position) at which the AF estimate amounts to the maximum, and the AF operation ends (steps S20 and S22).

On the other hand, if it is determined in step S18 that the focusing is NG ("NO"), the focusing control by the contrast AF is not performed. For example, the focusing lens is transferred to a default lens position corresponding to the focusing NG (step S24), and the AF operation ends (step S22).

When it is determined in step S14 that the determined AF area does not belong to the main pixel AF area ("NO"), the contrast AF is started using the sub-pixel image in the AF area (step S26).

Subsequently, it is determined whether or not the focusing is OK (step S28) in a manner similar to the above, and the flow proceeds to step S20 or step S24 in accordance with the determination result.

In the second embodiment, although when the focusing is NG, the focusing lens is directly transferred to the default lens position, and the AF operation ends, the present invention is not limited to this. For example, when the contrast AF using the main pixel image results in the focusing NG, the contrast AF using the sub-pixel image may be executed. Conversely, when the contrast AF using the sub-pixel image results in the focusing NG, the contrast AF using the main pixel image may be executed. Moreover, the focusing lens may be transferred to the default lens position only when the two contrast AF operations result in the focusing NG, and then, the AF operation ends.

Third Embodiment

Figure 7:
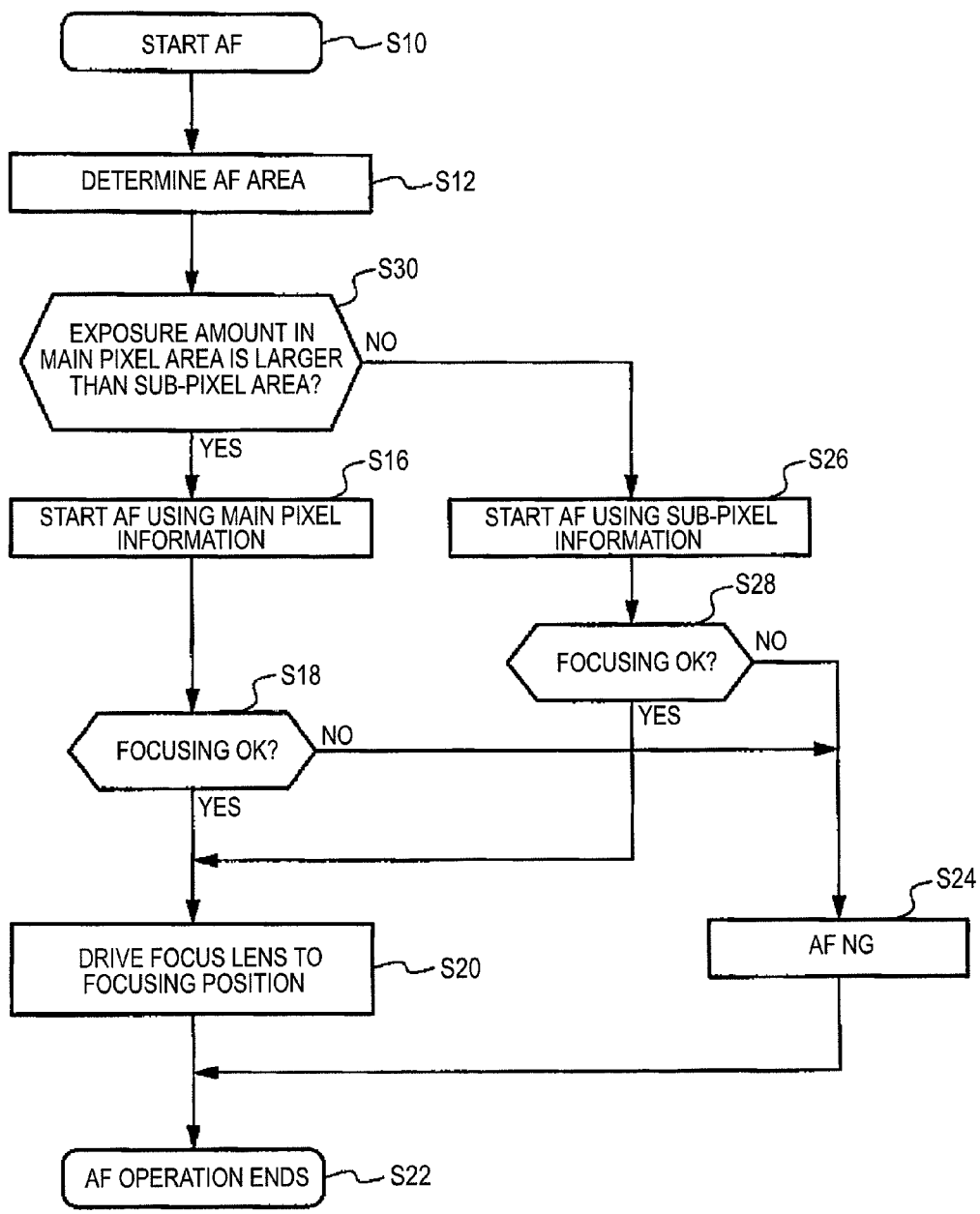
FIG. 7 is a flowchart of an AF operation in a stereoscopic imaging apparatus of a third embodiment of the present invention.

FIG. 7 is a flowchart of an AF operation in the stereoscopic imaging apparatus 10 of a third embodiment of the present invention. The same steps as the second embodiment shown in FIG. 6A will be denoted by the same step numbers, and detailed description thereof will be omitted.

As shown in FIG. 7, the third embodiment is different in that the process of step S30 is performed in place of the step S14 shown in FIG. 6A.

That is, in step S30, the exposure amount of the main pixel and the exposure amount of the sub-pixel in the AF area determined in step S10 are calculated, and an image of a pixel having a larger exposure amount is selected as the image for contrast AF. Therefore, when the exposure amount of the main pixel is larger than the exposure amount of the sub-pixel ("YES"), the flow proceeds to step S16. Conversely, when the exposure amount of the sub-pixel is larger than the exposure amount of the main pixel ("NO"), the flow proceeds to step S26.

The reason for using the image of the pixel having the larger exposure amount as the image for contrast AF is because the image (namely, brighter image) of the pixel having the larger exposure amount is an image having clearer contrast and is suitable for the contrast AF.

The exposure amount of the main pixel in the AF area can be calculated from an integrated value which is obtained by integrating image signals (for example, G signals) read out from the main pixel in the AF area, and the exposure amount of the sub-pixel in the AF area can be calculated in a manner similar to the above.

Fourth Embodiment

Figure 8:
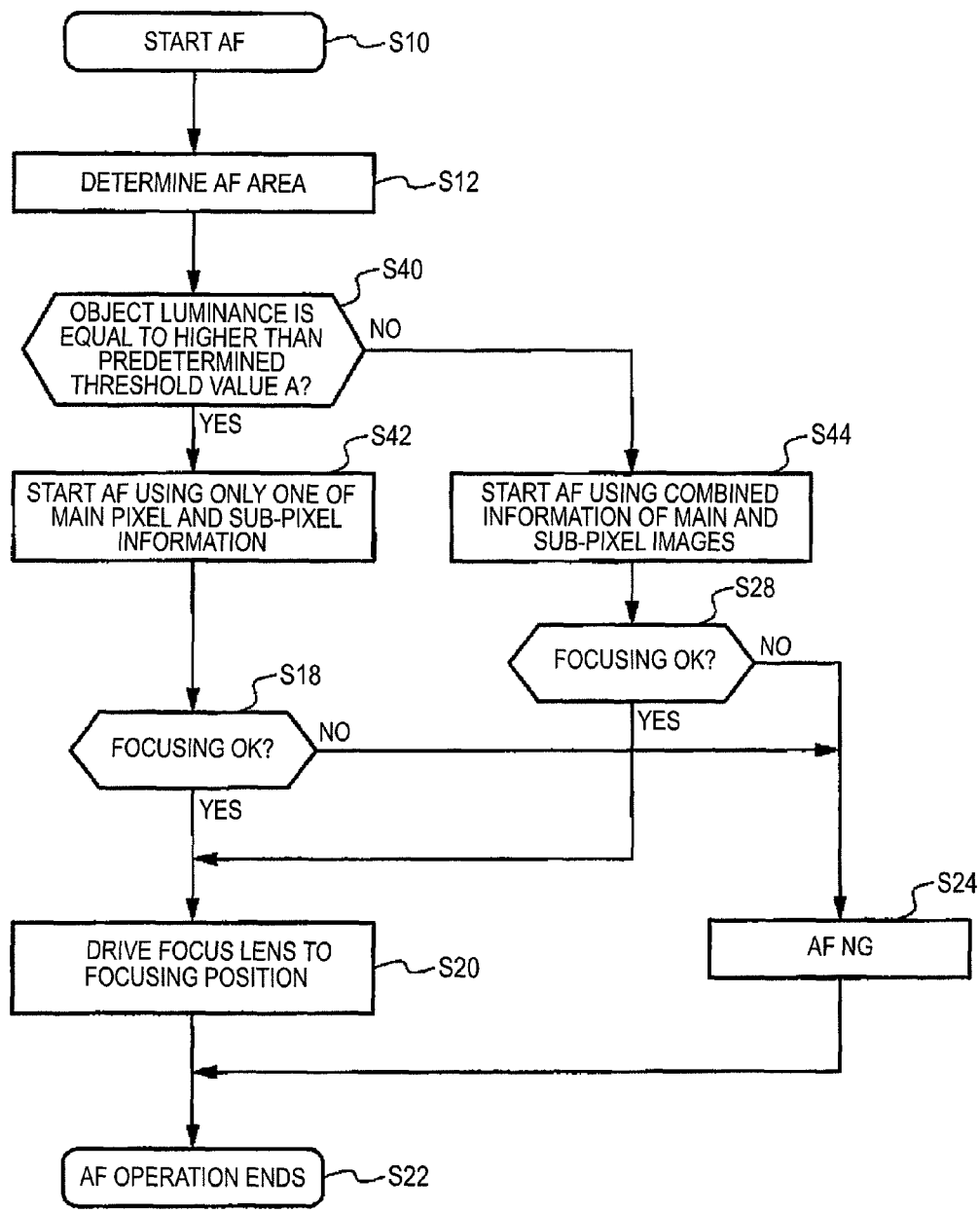
FIG. 8 is a flowchart of an AF operation in a stereoscopic imaging apparatus of a fourth embodiment of the present invention.

FIG. 8 is a flowchart of an AF operation in the stereoscopic imaging apparatus 10 of a fourth embodiment of the present invention. The same steps as the second embodiment shown in FIG. 6A will be denoted by the same step numbers, and detailed description thereof will be omitted.

As shown in FIG. 8, the fourth embodiment is different in that the processes of steps S40, S42, and S44 are performed in place of the steps S14, S16, and S26 shown in FIG. 6A.

In step S40, the luminance of the object in the AF area determined in step S10 is measured, and it is determined whether or not the luminance of the object is equal to or higher than a predetermined threshold value A. When the luminance of the object is equal to or higher than the predetermined threshold value A ("YES"), the flow proceeds to step S42. When the luminance of the object is lower than the predetermined threshold value A ("NO"), the flow proceeds to step S44.

In step S42, similarly to the first to third embodiments, the contrast AF is performed using only one of the main pixel image and the sub-pixel image. In step S44, the main pixel image and the sub-pixel image are combined (added), and the contrast AF is performed using the combined image.

The addition of the main pixel image and the sub-pixel image may involve addition of image data or may be performed through pixel combination when reading out a charge in the odd and even lines of pixels from the phase-difference CCD 16. Moreover, the predetermined threshold value A is set based on a brightness at which the focusing accuracy of the contrast AF decreases only in one of the main pixel image and the sub-pixel image.

Fifth Embodiment

Figure 9:
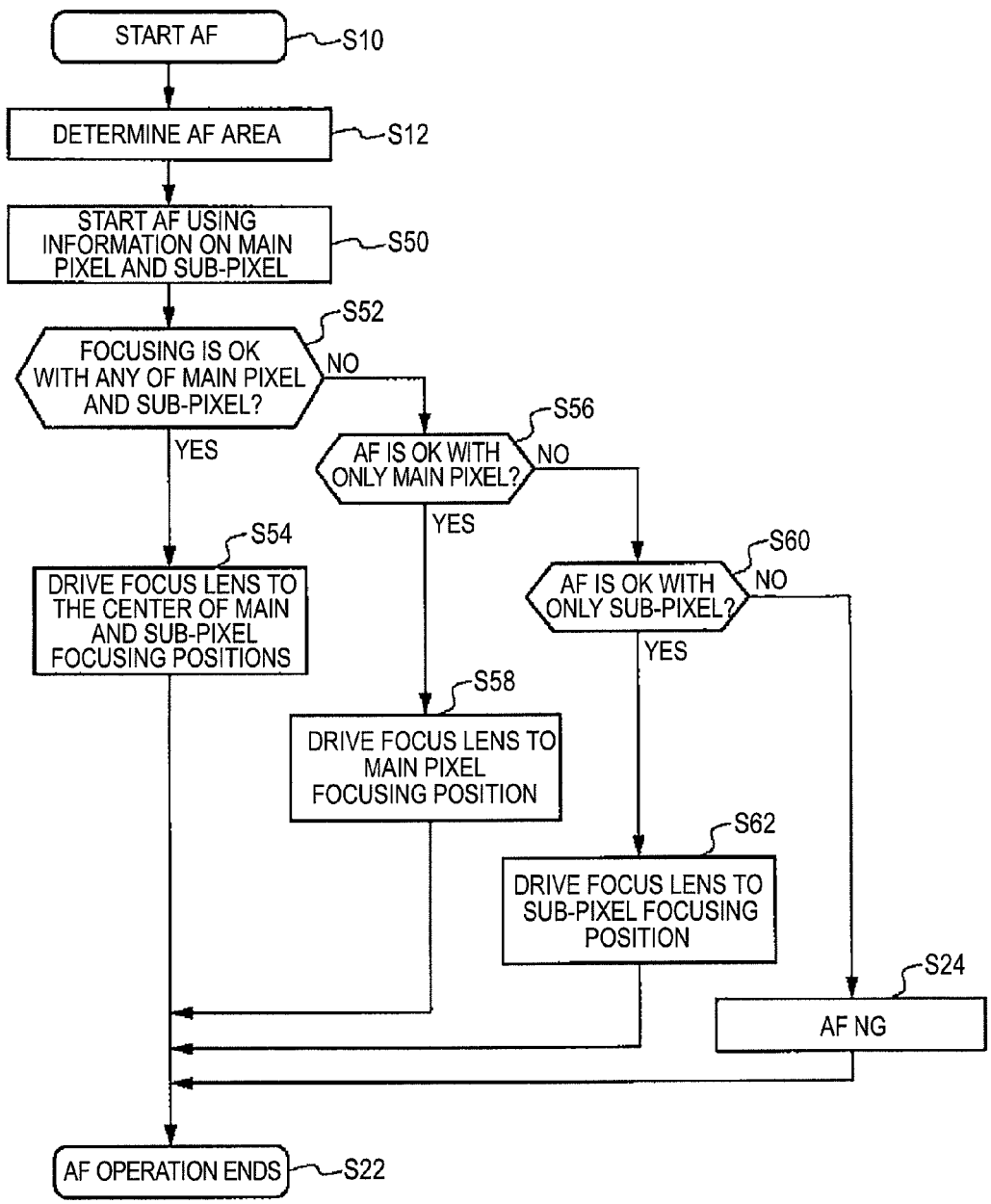
FIG. 9 is a flowchart of an AF operation in a stereoscopic imaging apparatus of a fifth embodiment of the present invention.

FIG. 9 is a flowchart of an AF operation in the stereoscopic imaging apparatus 10 of a fifth embodiment of the present invention. The same steps as the second embodiment shown in FIG. 6A will be denoted by the same step numbers, and detailed description thereof will be omitted.

In step S50 of FIG. 9, the contrast AF is started using the main pixel image and the sub-pixel image in the AF area determined in step S10 as the image for contrast AF.

Based on the AF estimate calculated from the main pixel image and the AF estimate calculated from the sub-pixel image, it is determined whether or not the contrast AF can be performed appropriately using any of the main pixel and sub-pixel images (step S52).

When the focusing can be achieved with any of the images ("YES"), a lens position (first focusing position) at which the AF estimate amounts to the maximum is calculated based on the AF estimates calculated from the main pixel image, and a lens position (second focusing position) at which the AF estimate amounts to the maximum is calculated based on the AF estimates calculated from the sub-pixel image. Then, the focusing lens is transferred to an intermediate position of these first and second focusing positions (step S54).

In this way, it is possible to equalize (that is, prevent blurring) the focusing accuracy of the main pixel image and the sub-pixel image.

On the other hand, when it is determined in step S52 that it is unable to perform the AF control using both the main and sub-pixel images ("NO"), it is determined whether or not the contrast AF can be performed using only the main pixel image (step S56). When the contrast AF can be performed based on the main pixel image ("YES"), the focusing lens is transferred to the first focusing position calculated from the main pixel image (step S58).

Moreover, when it is determined that it is unable to perform the contrast AF using the main pixel image ("NO"), it is determined whether or not the contrast AF can be performed based on the sub-pixel image (step S60).

When the contrast AF can be performed based on the sub-pixel image ("YES"), the focusing lens is transferred to the second focusing position calculated from the sub-pixel image (step S62). When it is unable to perform the contrast AF based on the sub-pixel image ("NO"), the flow proceeds to step S24.

Sixth Embodiment

Figure 10:
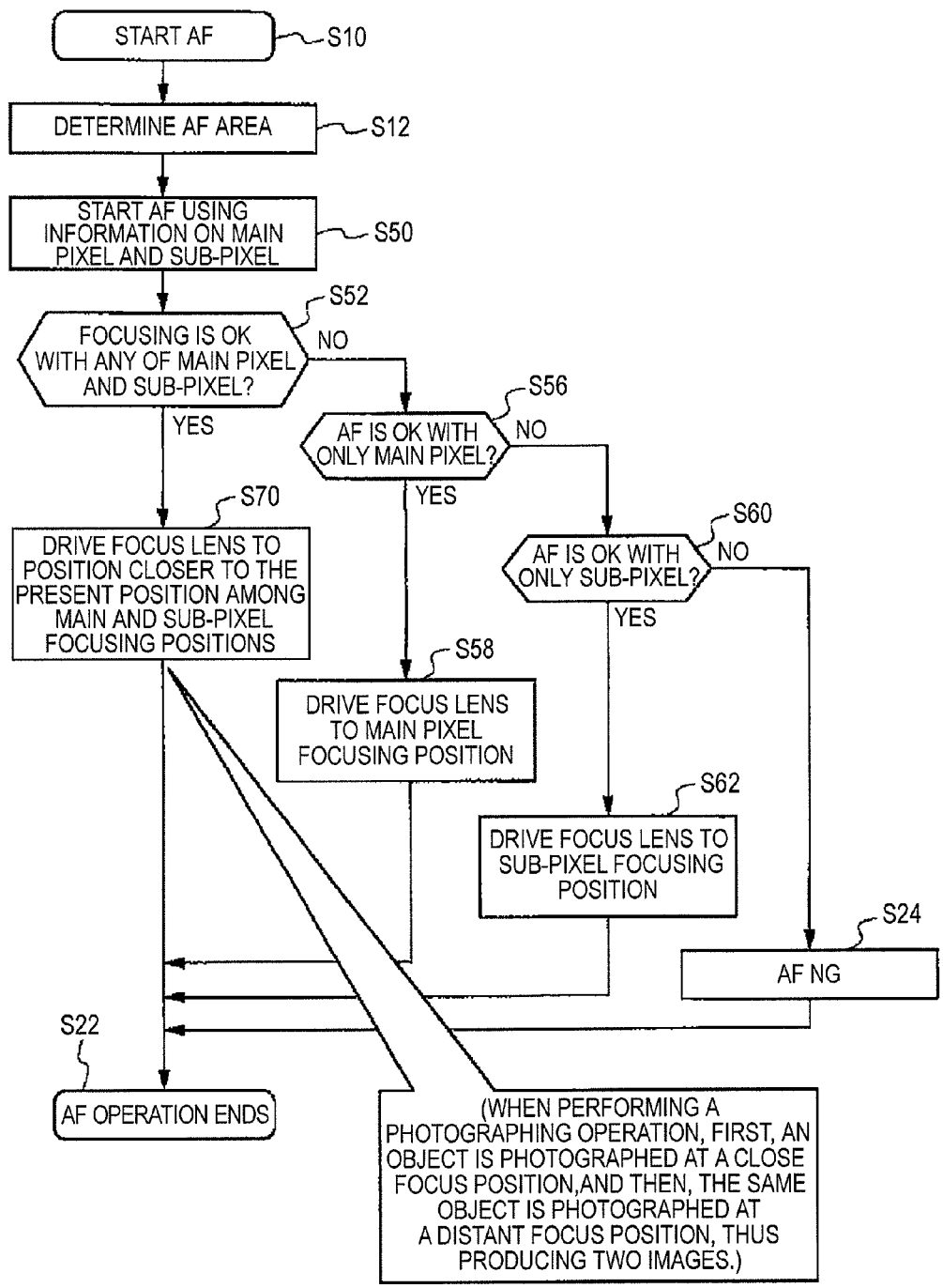
FIG. 10 is a flowchart of an AF operation in a stereoscopic imaging apparatus of a sixth embodiment of the present invention.

FIG. 10 is a flowchart of an AF operation in the stereoscopic imaging apparatus 10 of a sixth embodiment of the present invention. The same steps as the fifth embodiment shown in FIG. 9 will be denoted by the same step numbers, and detailed description thereof will be omitted.

As shown in FIG. 10, the sixth embodiment is different in that the process of step S70 is performed in place of the step S54 shown in FIG. 9.

That is, in step S70, the focusing lens is transferred to the first and the second focusing positions calculated from the main pixel and sub-pixel images.

As described above, at the time of the contrast AF, the focusing lens search-operations from the close side to the infinite side and the first and the second focusing positions are calculated based on the AF estimates acquired at the respective lens positions during the search operation. The focusing lens is sequentially transferred from a focusing position closer to the present position of the focusing lens after the search operation among the first and the second focusing positions. The search operation may be performed such that the focusing lens transfers from the infinite side to the close side.

When the focusing lens is sequentially transferred to the focusing positions in the above-described manner, and the AF operation ends, photographing is performed at the respective focusing positions. With this configuration, it is possible to obviate unnecessary transferring of the focusing lens after contrast AF is performed so as to calculate the first and the second lens positions and before photographing is performed at the respective lens positions. Thus, the photographing operation can be performed without delay.

Seventh Embodiment

Figure 11:
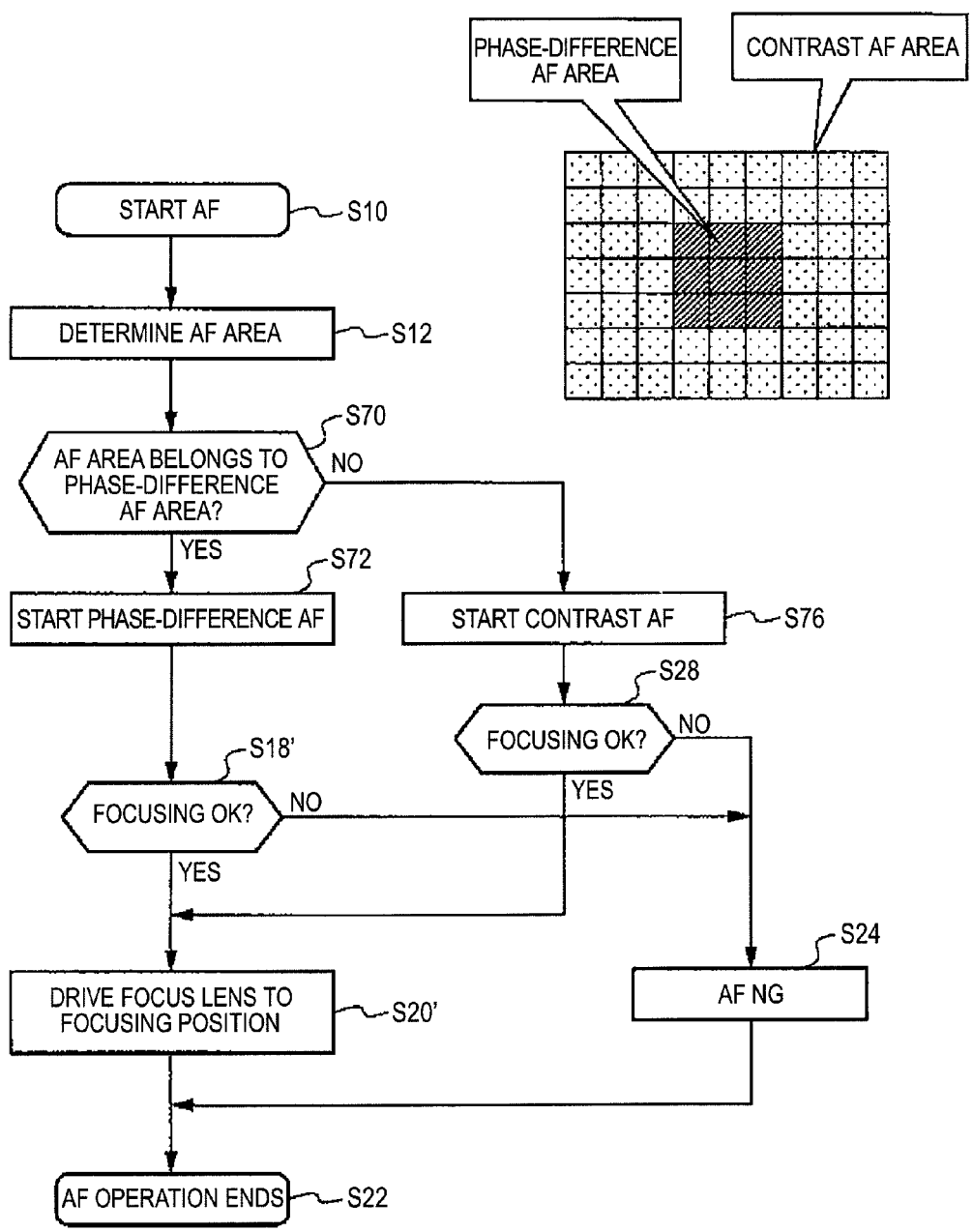
FIG. 11A is a flowchart of an AF operation in a stereoscopic imaging apparatus of a seventh embodiment of the present invention.
FIG. 11B shows a phase-difference AF area and a contrast AF area.

FIG. 11A is a flowchart of an AF operation in the stereoscopic imaging apparatus 10 of a seventh embodiment of the present invention. The same steps as the second embodiment shown in FIG. 6A will be denoted by the same step numbers, and detailed description thereof will be omitted.

The AF processing section 42 (FIG. 1) of the stereoscopic imaging apparatus 10 of the seventh embodiment functions as a section that performs the contrast AF processing as described above and also performs a section that performs the phase-difference AF processing.

That is, the AF processing section 42 functioning as the section that performs the phase-difference AF processing calculates a correlation between the main pixel image data and the sub-pixel image data in the AF area. For example, the differences between the main pixel image data and the sub-pixel image data are calculated for each pixel, and the absolute values of the differences are added. In this case, the correlation between the main pixel image data and the sub-pixel image data decreases as the addition result increases, and the correlation between the main pixel image data and the sub-pixel image data increases as the addition result decreases.

The correlation is calculated while shifting the main pixel image data and the sub-pixel image data in the horizontal direction by a distance of one pixel, and a pixel shift amount (phase difference) at which the correlation amounts to the maximum is calculated. The AF processing section 42 outputs information representing the pixel shift amount (phase difference) calculated in this way to the CPU 40.

When the phase-difference AF is performed, the CPU 40 calculates a defocus amount based on the information representing the phase difference between the main pixel and sub-pixel images in the AF area input from the AF processing section 42 and controls the focusing lens in the photographing optical system 12 so that the defocus amount becomes 0.

In step S70 of FIG. 11A, it is determined whether or not the AF area determined in step S12 belongs to an area (phase-difference AF area) where the AF control is performed by phase-difference AF or belongs to an area (contrast AF area) where the AF control is performed by the contrast AF.

Here, the phase-difference AF area and the contrast AF area are determined in advance as shown in FIG. 11B.

FIG. 11B shows 80 AF areas which divide a whole phase-difference CCD into 8×10 areas. In the seventh embodiment, the central 3×3 area of FIG. 11B is determined as the phase-difference AF area, and the remaining area (surrounding area) is determined as the contrast AF area.

The reason for determining the phase-difference AF area and the contrast AF area in the above-described manner is because the main pixel image and the sub-pixel image have different contrast, luminance, and the like in areas near the photographic angle of view. Thus, the focusing accuracy decreases if the phase-difference AF is applied to the surrounding area, and in the central area, fast AF control can be performed by the phase-difference AF.

When it is determined in step S70 that the AF area belongs to the phase-difference AF area ("YES"), the phase-difference AF starts (step S72). That is, as described above, a pixel shift amount (phase difference) at which the correlation between the main pixel image and the sub-pixel image in the AF area amounts to the maximum is calculated, and the defocus amount is calculated based on the information representing the phase difference.

Subsequently, it is determined whether or not the maximum correlation value between the main pixel image and the sub-pixel image is equal to or larger than a predetermined threshold value (whether or not the focusing is OK) (step S18'). When the maximum correlation value between the main pixel image and the sub-pixel image is equal to or larger than the predetermined threshold value ("YES"), the focusing lens is transferred by a distance corresponding to the defocus amount calculated in step S72, and the AF operation ends (steps S20' and S22).

On the other hand, when it is determined in step S70 that the determined AF area belongs to the contrast AF area ("NO"), the contrast AF is started using the main pixel or sub-pixel image in the AF area (step S76).

That is, the CPU 40 controls the lens driver 36 to cause a focusing lens (not shown) in the photographing optical system 12 to conduct search-operation from the close side to the infinite side and acquires AF estimates calculated by the AF processing section 42 at each lens position based on the main pixel image in the AF area. From these acquired AF estimates, the CPU 40 calculates the maximum value of the AF estimates and the lens position at which the AF estimate amounts to the maximum.

It is determined whether or not the calculated maximum AF estimate is larger than a predetermined threshold value (whether or not focusing is OK). If the focusing is OK ("YES"), the focusing lens is transferred to the lens position (focusing position) at which the AF estimate amounts to the maximum, and the AF operation ends (steps S20' and S22).

With this configuration, by selectively using the phase-difference AF and the contrast AF, it is possible to accelerate the AF processing and prevent focusing accuracy from decreasing near the angle of view.

In the seventh embodiment, when it is determined in steps S18' and S28 that the focusing is NG, the flow proceeds directly to step S24. However, the AF method may be switched to another AF method, and it may be determined again whether or not the focusing is OK. The flow may proceed to step S24 only when the focusing is NG in any of the AF methods.

Eighth Embodiment

Figure 12:
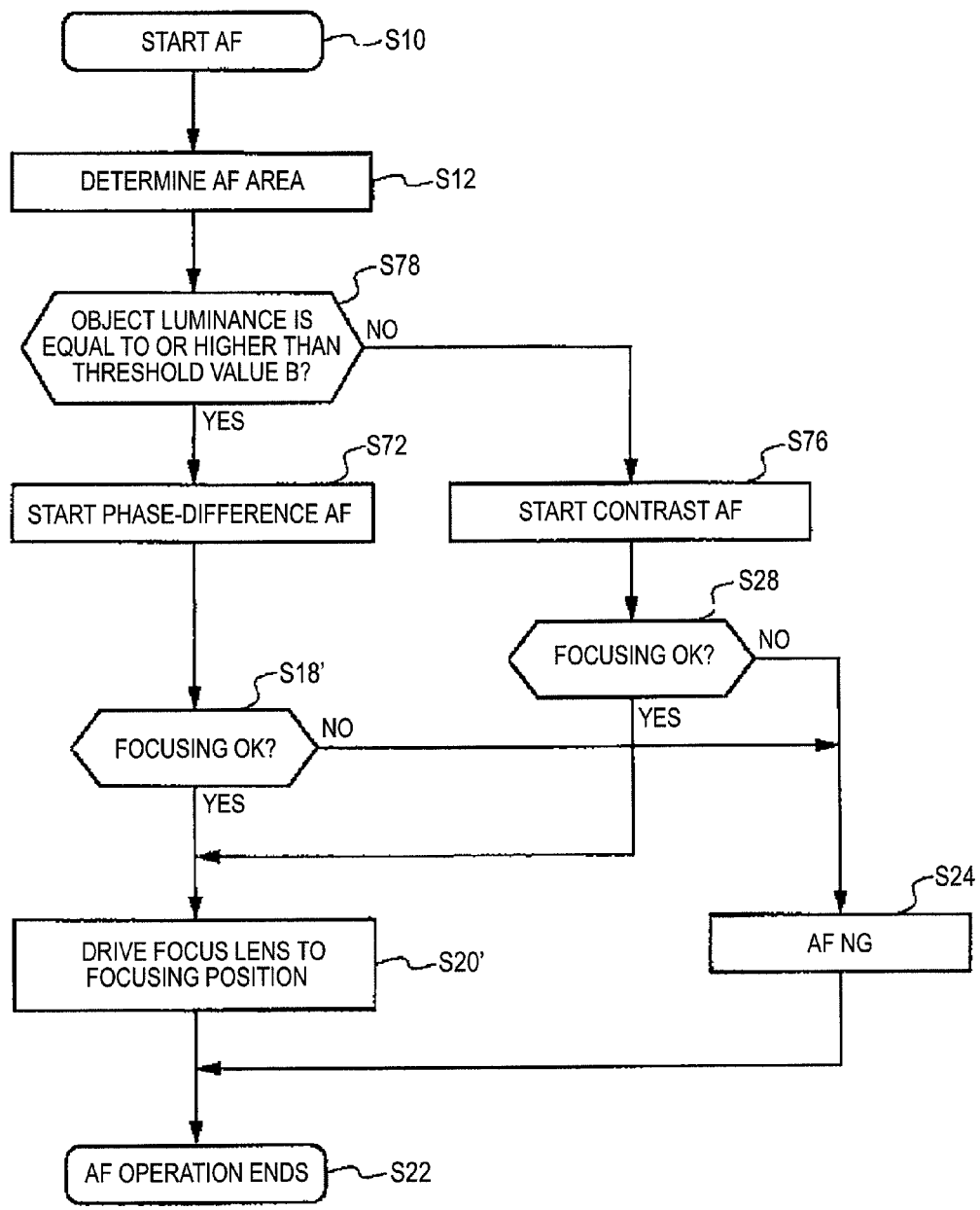
FIG. 12 is a flowchart of an AF operation in a stereoscopic imaging apparatus of an eighth embodiment of the present invention.

FIG. 12 is a flowchart of an AF operation in the stereoscopic imaging apparatus 10 of an eighth embodiment of the present invention. The same steps as the seventh embodiment shown in FIG. 11A will be denoted by the same step numbers, and detailed description thereof will be omitted.

As shown in FIG. 12, the eighth embodiment is different in that the process of step S78 is performed in place of the step S70 shown in FIG. 11A.

That is, in step S78, the luminance of the object in the AF area determined in step S10 is measured, and it is determined whether or not the luminance of the object is equal to or higher than a predetermined threshold value B. When the luminance of the object is equal to or higher than the predetermined threshold value B ("YES"), the flow proceeds to step S72. When the luminance of the object is lower than the predetermined threshold value B ("NO"), the flow proceeds to step S76.

The reason for selectively using the phase-difference AF and the contrast AF in accordance with the luminance of the object of the AF area in the above-described manner is because the focusing accuracy of the phase-difference AF in a dark image is lower than the contrast AF, whereas the contrast AF is unlikely to be affected by noise or the like included in a low-luminance object. The predetermined threshold value B is higher than the threshold value A in step S40 of FIG. 8.

Ninth Embodiment

Figure 13:
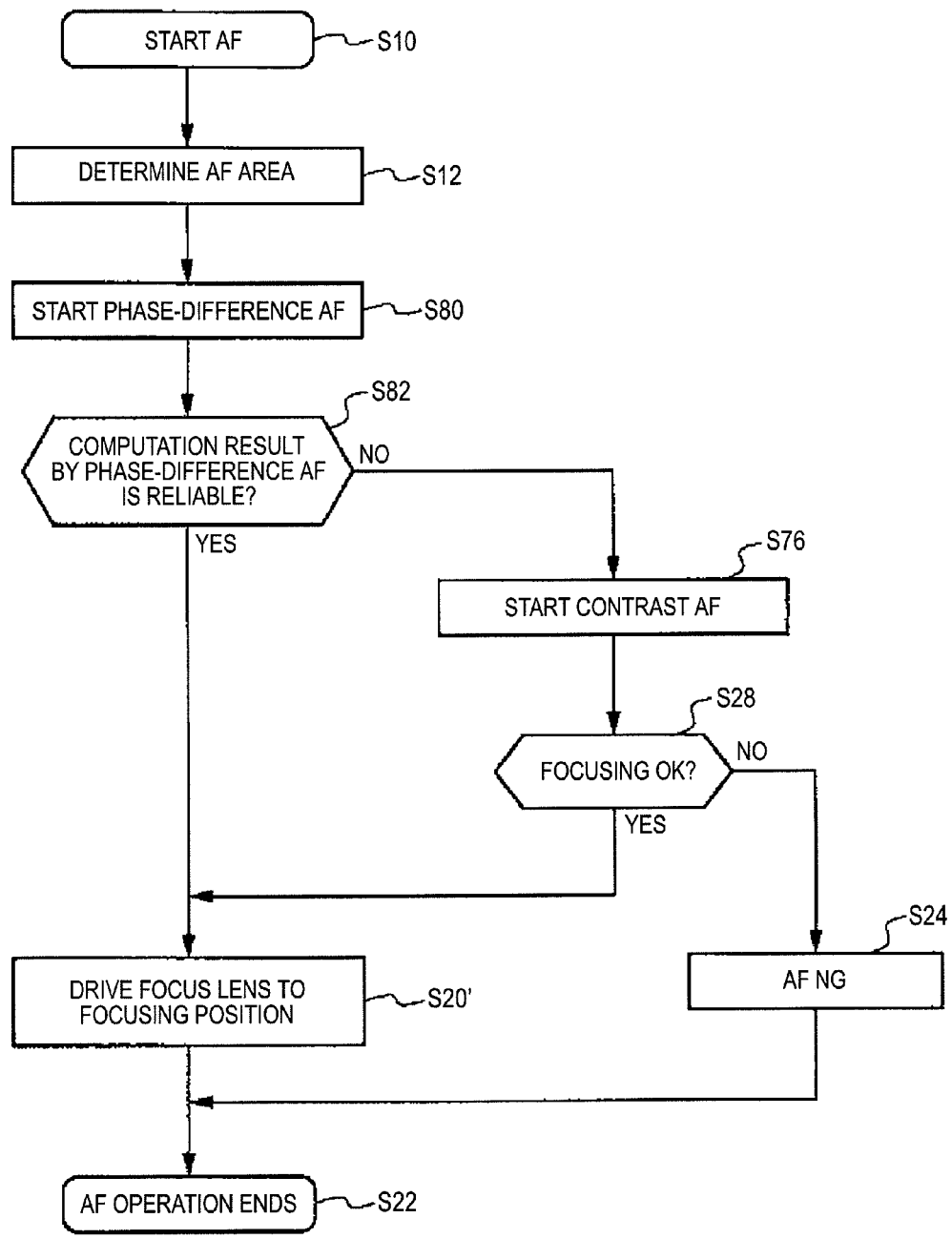
FIG. 13 is a flowchart of an AF operation in a stereoscopic imaging apparatus of a ninth embodiment of the present invention.

FIG. 13 is a flowchart of an AF operation in the stereoscopic imaging apparatus 10 of a ninth embodiment of the present invention. The same steps as the seventh embodiment shown in FIG. 11A will be denoted by the same step numbers, and detailed description thereof will be omitted.

As shown in FIG. 13, the ninth embodiment is different in that the processes of steps S80 and S82 are performed in place of the step S70 shown in FIG. 11A.

That is, in step S78, the phase-difference AF processing is started immediately when the AF area is determined in step S10. After that, it is determined whether or not the computation result by the phase-difference AF is reliable (step S82). The reliability of the computation result by the phase-difference AF can be determined by the maximum correlation value between the main pixel image and the sub-pixel image or the variation pattern of the correlation.

When it is determined that the computation result by the phase-difference AF is reliable ("YES"), the flow proceeds to step S20'. When it is determined that the computation result is not reliable ("NO"), the flow proceeds to step S76.

Tenth Embodiment

Figure 14:
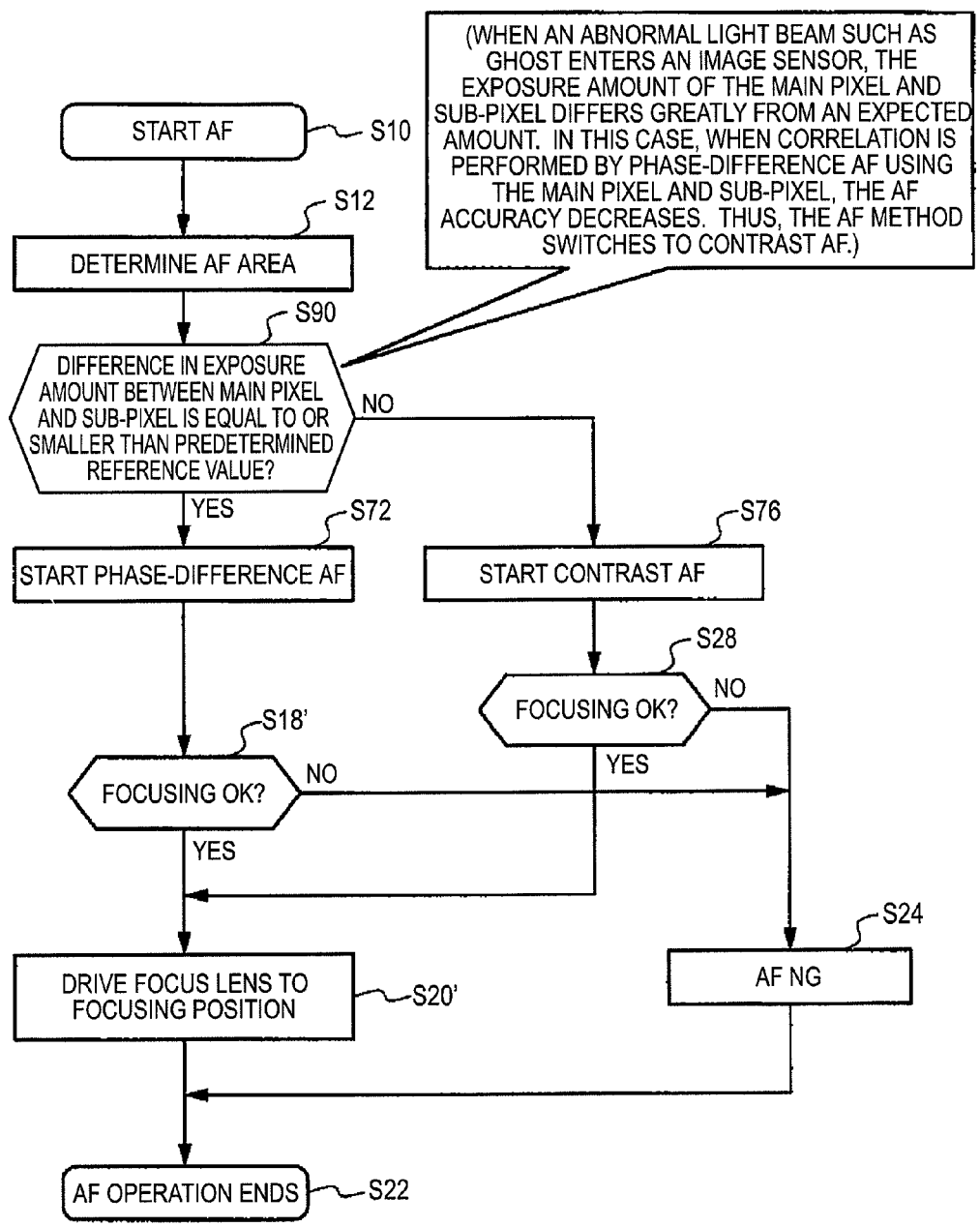
FIG. 14 is a flowchart of an AF operation in a stereoscopic imaging apparatus of a tenth embodiment of the present invention.

FIG. 14 is a flowchart of an AF operation in the stereoscopic imaging apparatus 10 of a tenth embodiment of the present invention. The same steps as the seventh embodiment shown in FIG. 11A will be denoted by the same step numbers, and detailed description thereof will be omitted.

As shown in FIG. 14, the tenth embodiment is different in that the process of step S90 is performed in place of the step S70 shown in FIG. 11A.

That is, in step S90, the exposure amount of the main pixel and the exposure amount of the sub-pixel in the AF area determined in step S10 are calculated, and a difference between these exposure amounts is calculated. Then, it is determined whether or not the difference in exposure amount is equal to or smaller than a predetermined reference value (for example, 0.5 EV). When the difference in exposure amount is equal to or smaller than the predetermined reference value ("YES"), the flow proceeds to step S72. When the difference in exposure amount is larger than the predetermined reference value ("NO"), the flow proceeds to step S76.

The reason for selecting the AF method by the contrast AF when the difference in exposure amount is larger than the predetermined reference value is because an abnormal light beam such as ghosting entering the phase-difference CCD 16 generally enters either one of the main pixel and sub-pixel, thus deteriorating the reliability of the phase-difference AF.

With this configuration, by selectively using the phase-difference AF and the contrast AF, it is possible to accelerate the AF processing and achieve AF control wherein it is unlikely to be affected by ghosting or the like.

Modifications

Figure 15:
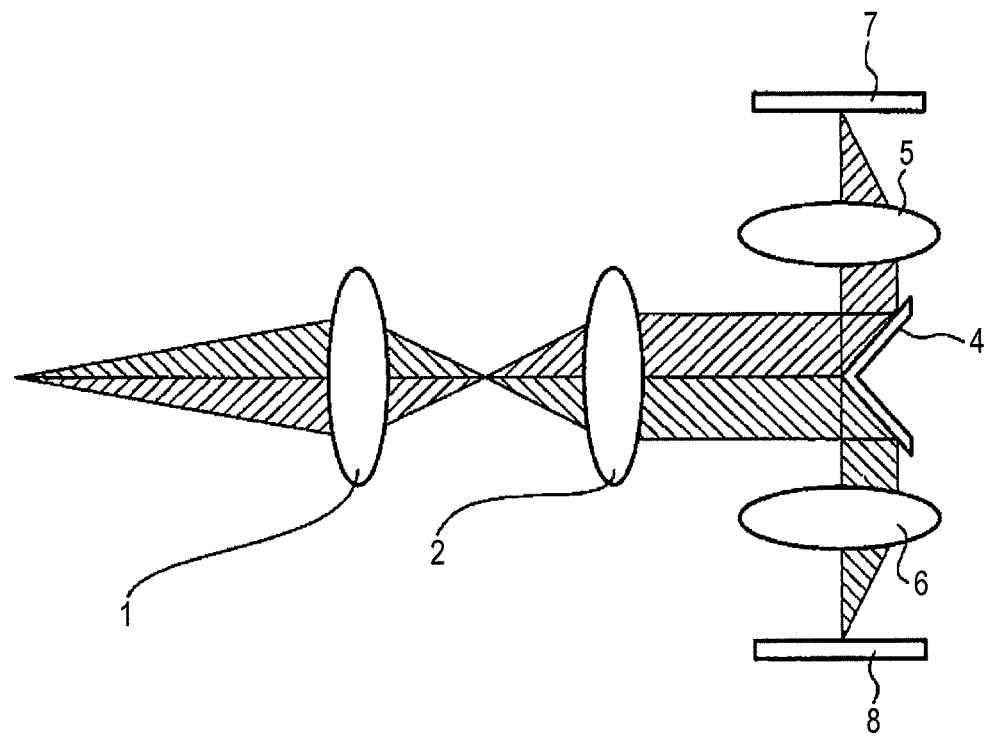
FIG. 15 shows one example of an optical system of a stereoscopic imaging apparatus according to the related art.
Figures 16A, 16B, 16C:
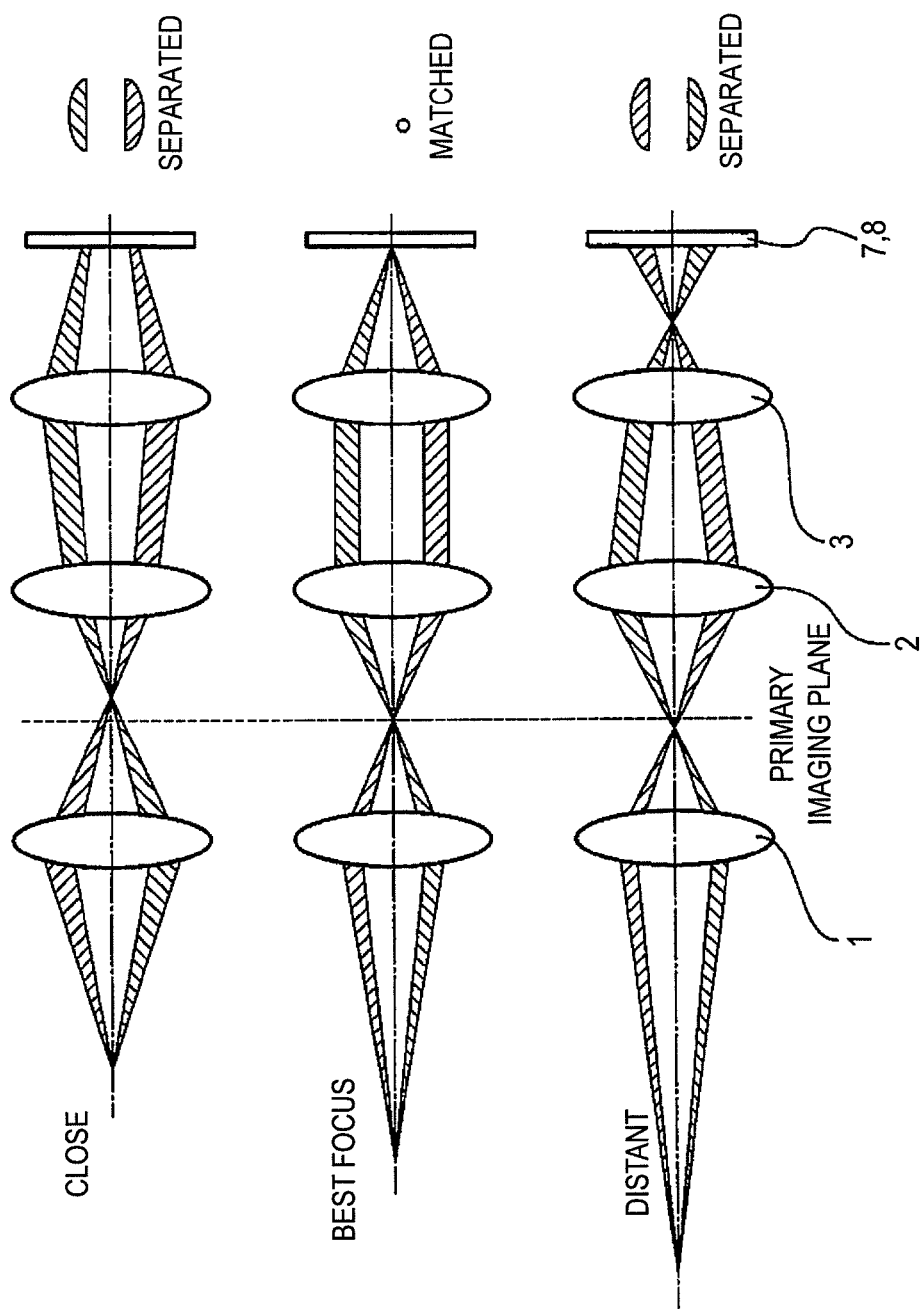
FIGS. 16A to 16C show the principle of how an image with a phase difference is imaged by a stereoscopic imaging apparatus.

Since the stereoscopic imaging apparatus 10 of the embodiment described above uses one phase-difference CCD 16, it is possible to further decrease the size of the stereoscopic imaging apparatus more so than a stereoscopic imaging apparatus which uses two image sensors 7 and 8 shown in FIG. 15. However, the present invention is not limited to one which uses one image sensor, but is also applicable to one which has the optical system and image sensors of the related art shown in FIG. 15.

The image sensor is not limited to the CCD sensor of this embodiment, but an image sensor such as a CMOS sensor may be used.

In the embodiments described above, the main pixel image and the sub-pixel image representing the object images which are pupil-split in the horizontal direction were obtained. However, the number of object images which are pupil-split is not limited to two, and the direction where the pupil split is not limited to the horizontal direction but the pupil may be split in the vertical and horizontal directions.

The present invention is not limited to the above-described embodiments but may be modified in various forms within a range without departing from the spirit of the present invention.

What is claimed is:

1. A imaging apparatus comprising:
   a single photographing optical system;
   an image sensor for forming images from pupil-split object images which had passed through a first and a second regions of the photographing optical system with each region in a predetermined different direction, and the image sensor photo-electrically converts the object images which had passed through the first and the second regions to output a first image and a second image;
   an autofocus (hereinafter AF) image selecting part for selecting the image from the first or the second images to be used for contrast AF; and
   a contrast AF controlling part for controlling the positions of a lens in the photographing optical system by using the image selected with the AF image selecting part in order to maximize an image contrast in a predetermined AF area of the image,
   wherein in the AF image selecting part, information which is used to select an image corresponding to an object image that passes through a region having a smaller aberration among the first and the second regions in the predetermined direction of the photographing optical system is set in advance according to the selected photographing optical system.

2. The imaging apparatus according to claim 1, further comprising:
   a detecting part for detecting the position of a main object within an angle of view; and
   an AF area determining part for determining the predetermined AF area based on the detected position of the main object within the angle of view.

3. The imaging apparatus according to claim 1, further comprising an AF area determining part for determining an arbitrary area within a photographed angle of view as the predetermined AF area.

4. An imaging apparatus comprising:
   a single photographing optical system;
   an image sensor for forming images from pupil-split object images which had passed through a first and a second regions of the photographing optical system with each region in a predetermined different direction, and the image sensor photo-electrically converts the object images which had passed through the first and the second regions to output a first image and a second image;
   an autofocues (hereinafter AF) image selecting part for selecting the image from the first or the second images to be used for contrast AF;
   a contrast AF controlling part for controlling the positions of a lens in the photographing optical system by using the image selected with the AF image selecting part in order to maximize an image contrast in a predetermined AF area of the image;
   a detecting part for detecting the position of a main object within an angle of view;
   an AF area determining part for determining the predetermined AF area based on the detected position of the main object within the angle of view; and
   an area setting section for dividing entire area of the image photographed by the image sensor into left and right to set the divided area as a first area and a second area,
   wherein the AF image selecting part selects the image for contrast AF depending on which one of the first and the second areas set by the area setting section belongs to the position of the AF area determined by the AF area determining part.

5. An imaging apparatus, comprising:
   a single photographing optical system;
   an image sensor for forming images from pupil-split object images which had passed through a first and a second regions of the photographing optical system with each region in a predetermined different direction, and the image sensor photo-electrically converts the object images which had passed through the first and the second regions to output a first image and a second image;
   an autofocus (hereinafter AF) image selecting part for selecting the image from the first or the second images to be used for contrast AF;
   a contrast AF controlling part for controlling the positions of a lens in the photographing optical system by using the image selected with the AF image selecting part in order to maximize an image contrast in a predetermined AF area of the image;
   a detecting part for detecting the position of a main object within an angle of view; and
   an AF area determining part for determining the predetermined AF area based on the detected position of the main object within the angle of view,
   wherein the AF image selecting part selects an image having a larger exposure amount among the first and the second images within the AF area determined by the AF area determining part as the image for contrast AF.

6. An imaging apparatus comprising:
   a single photographing optical system;
   an image sensor for forming images from pupil-split object images which had passed through a first and a second regions of the photographing optical system with each region in a predetermined different direction, and the image sensor photo-electrically converts the object images which had passed through the first and the second regions to output a first image and a second image;
   an autofocus (hereinafter AF) image selecting part for selecting the image from the first or the second images to be used for contrast AF;
   a contrast AF controlling part for controlling the positions of a lens in the photographing optical system by using the image selected with the AF image selecting part in order to maximize an image contrast in a predetermined AF area of the image; and
   a detecting part for detecting luminance of the object within the determined AF area,
   wherein either one of the first and the second images in the AF area is used as the image for contrast AF when the detected luminance of the object is equal to or higher than a predetermined threshold value, and a combined image of the first and the second images in the AF area is used as the image for contrast AF when the detected luminance of the object is lower than the predetermined threshold value.

7. An imaging apparatus comprising:
   a single photographing optical system;
   an image sensor for forming images from pupil-split object images which had passed through a first and a second regions of the photographing optical system with each region in a predetermined different direction, and the image sensor photo-electrically converts the object images which had passed through the first and the second regions to output a first image and a second image;

a contrast autofocus (hereinafter AF) controlling part for controlling a lens position of a focusing lens in the photographing optical system by using at least one of the first and the second images as an image for contrast AF in order to maximize an image contrast in a predetermined AF area in the image;

a defocus amount calculating part for calculating a defocus amount of the photographing optical system based on respective images in the predetermined AF area of the first and the second images;

a phase-difference AF controlling part for controlling the lens position of the focusing lens in the photographing optical system so that the defocus amount calculated by the defocus amount calculating part becomes 0;

an AF control method selecting part for selecting which one of an AF control method by the contrast AF controlling part and an AF control method by the phase-difference AF controlling part to be used;

a detecting part for detecting the position of a main object in an angle of view; and an AF area determining part for determining the predetermined AF area based on the detected position of the main object in the angle of view, wherein the AF control method selecting part selects the AF control method by the phase-difference AF controlling part when a luminance of the object of the AF area determined by the AF area determining part is equal to or higher than a predetermined luminance and selects the AF control method by the contrast AF controlling part when the luminance of the object is lower than the predetermined luminance.

8. An imaging apparatus comprising:

a single photographing optical system;

an image sensor for forming images from pupil-split object images which had passed through a first and a second regions of the photographing optical system with each region in a predetermined different direction, and the image sensor photo-electrically converts the object images which had passed through the first and the second regions to output a first image and a second image;

a contrast autofocus (hereinafter AF) controlling part for controlling a lens position of a focusing lens in the photographing optical system by using at least one of the first and the second images as an image for contrast AF in order to maximize an image contrast in a predetermined AF area in the image;

a defocus amount calculating part for calculating a defocus amount of the photographing optical system based on respective images in the predetermined AF area of the first and the second images;

a phase-difference AF controlling part for controlling the lens position of the focusing lens in the photographing optical system so that the defocus amount calculated by the defocus amount calculating part becomes 0; and an AF control method selecting part for selecting which one of an AF control method by the contrast AF controlling part and an AF control method by the phase-difference AF controlling part to be used;

wherein the defocus amount calculating part calculates the defocus amount based on a phase difference between respective images at which the maximum correlation value is obtained between the respective images in the predetermined AF area of the first and the second images, and wherein the AF control method selecting part selects the AF control method by the phase-difference AF controlling part when the obtained maximum correlation value is higher than a predetermined value and selects the AF control method by the contrast AF controlling part when the obtained maximum correlation value is lower than the predetermined value.

9. An imaging apparatus comprising:

a single photographing optical system;

an image sensor for forming images from pupil-split object images which had passed through a first and a second regions of the photographing optical system with each region in a predetermined different direction, and the image sensor photo-electrically converts the object images which had passed through the first and the second regions to output a first image and a second image;

a contrast autofocus (hereinafter AF) controlling part for controlling a lens position of a focusing lens in the photographing optical system by using at least one of the first and the second images as an image for contrast AF in order to maximize an image contrast in a predetermined AF area in the image;

a defocus amount calculating part for calculating a defocus amount of the photographing optical system based on respective images in the predetermined AF area of the first and the second images;

a phase-difference AF controlling part for controlling the lens position of the focusing lens in the photographing optical system so that the defocus amount calculated by the defocus amount calculating part becomes 0;

an AF control method selecting part for selecting which one of an AF control method by the contrast AF controlling part and an AF control method by the phase-difference AF controlling part to be used;

a detecting part for detecting the position of a main object in an angle of view; and an AF area determining part for determining the predetermined AF area based on the detected position of the main object in the angle of view, wherein the AF control method selecting part detects a difference between the exposure amounts of the first and the second images in the determined AF area, selects the AF control method by the phase-difference AF controlling part when the detected difference in exposure amount is smaller than a predetermined value, and selects the AF control method by the contrast AF controlling part when the detected difference in exposure amount is larger than the predetermined value.

10. The stereoscopic imaging apparatus according to claim 4, 5, 6, 7, 8 or 9, wherein the image sensor includes first and second groups of pixels for photoelectric conversion which are arranged in a matrix form over approximately the entire exposure region of the image sensor, the first group of pixels having limits to the direction of receiving light beams to receive only an object image having passed through the first region of the photographing optical system, and the second group of pixels having limits to the direction of receiving light beams to receive only an object image having passed through the second region of the photographing optical system, and wherein the image sensor is capable of reading out the first and the second images from the first and the second groups of pixels.

* * * * *